United States Patent
Brown et al.

(10) Patent No.: US 8,805,739 B2
(45) Date of Patent: Aug. 12, 2014

(54) SYSTEM AND METHOD FOR ELECTRONIC BILL PAY AND PRESENTMENT

(75) Inventors: Karen Lavern Brown, Bear, DE (US); Lisa Kim Manarky, Wilmington, DE (US)

(73) Assignee: JPMorgan Chase Bank, National Association, New York, NY (US)

( * ) Notice: Subject to any disclaimer, the term of this patent is extended or adjusted under 35 U.S.C. 154(b) by 1506 days.

(21) Appl. No.: 09/814,783

(22) Filed: Mar. 23, 2001

(65) Prior Publication Data

US 2004/0158522 A1    Aug. 12, 2004

Related U.S. Application Data

(60) Provisional application No. 60/264,681, filed on Jan. 30, 2001.

(51) Int. Cl.
*G06Q 40/00* (2012.01)
(52) U.S. Cl.
USPC .................................. 705/40; 705/38; 705/39
(58) Field of Classification Search
USPC ............ 235/380, 379; 705/34, 38, 39, 40, 41, 705/42, 80; 713/201; 380/24
See application file for complete search history.

(56) References Cited

U.S. PATENT DOCUMENTS

| | | | |
|---|---|---|---|
| 2,005,003 A | 6/1935 | Patton et al. | |
| 3,653,480 A | 4/1972 | Yamamoto et al. | |
| 3,938,090 A | 2/1976 | Borison et al. | |
| 4,050,375 A | 9/1977 | Orleans | |
| 4,141,078 A | 2/1979 | Bridges et al. | |
| 4,205,780 A | 6/1980 | Burns | |
| 4,264,808 A | 4/1981 | Owens et al. | |
| 4,321,672 A | 3/1982 | Braun | |
| 4,385,285 A | 5/1983 | Horst et al. | |
| 4,396,985 A | 8/1983 | Ohara | |
| 4,443,027 A | 4/1984 | McNeely et al. | |

(Continued)

FOREIGN PATENT DOCUMENTS

| EP | 421808 | 4/1991 |
|---|---|---|
| EP | 0665486 | 8/1995 |

(Continued)

OTHER PUBLICATIONS

Keith Lamond, Credit Card Transactions Real World and Online, http://www.virtualschool.edu/mon/ElectronicProperty/klamond/credit_card.htm, 1996, pp. 1-17.*

(Continued)

*Primary Examiner* — Ojo Oyebisi
(74) *Attorney, Agent, or Firm* — Hunton & Williams LLP

(57) ABSTRACT

A system and method is disclosed enabling a customer payor to make payment to a payee in a networked environment using a credit card, revolving credit, or other credit account. The payment system may provide for online receipt and review of bills, and may allow a customer payor to optionally select one or more alternative secondary accounts for payment in the event that payment cannot be made from a primary credit account. The secondary account may be another credit account, a checking account, a brokerage account, or another type of account. Actual payment may be accomplished by electronic settlement of a credit transaction, electronic funds transfer, or by printing and physically delivering a paper check. A customer payor using the system and method may receive notification concerning the success or failure of the transaction.

29 Claims, 4 Drawing Sheets

(56) References Cited

U.S. PATENT DOCUMENTS

| | | | |
|---|---|---|---|
| 4,453,074 A | 6/1984 | Weinstein | |
| 4,454,414 A | 6/1984 | Benton | |
| RE31,692 E | 10/1984 | Tyburski et al. | |
| 4,495,018 A | 1/1985 | Vohrer | |
| 4,575,621 A | 3/1986 | Dreifus | |
| 4,605,844 A | 8/1986 | Haggan | |
| 4,614,861 A | 9/1986 | Pavlov et al. | |
| 4,617,457 A | 10/1986 | Granzow | |
| 4,633,397 A | 12/1986 | Macco | 364/406 |
| 4,634,845 A | 1/1987 | Hale et al. | 235/350 |
| 4,650,981 A | 3/1987 | Foletta | |
| 4,669,730 A | 6/1987 | Small | |
| 4,672,377 A | 6/1987 | Murphy | |
| 4,694,397 A | 9/1987 | Grant et al. | |
| 4,697,072 A | 9/1987 | Kawana | |
| 4,700,055 A | 10/1987 | Kashkashian | |
| 4,701,601 A | 10/1987 | Francini et al. | |
| 4,713,761 A | 12/1987 | Sharpe et al. | |
| 4,750,119 A | 6/1988 | Cohen et al. | 364/401 |
| 4,752,676 A | 6/1988 | Leonard et al. | |
| 4,752,877 A | 6/1988 | Roberts et al. | |
| 4,766,293 A | 8/1988 | Boston | 235/379 |
| 4,797,913 A | 1/1989 | Kaplan | |
| 4,799,156 A | 1/1989 | Shavit | |
| 4,807,177 A | 2/1989 | Ward | |
| 4,812,628 A | 3/1989 | Boston | |
| 4,817,949 A | 4/1989 | Bachman et al. | |
| 4,823,264 A | 4/1989 | Deming | |
| 4,831,242 A | 5/1989 | Englehardt et al. | 235/382 |
| 4,845,347 A | 7/1989 | McCrindle | |
| 4,859,837 A | 8/1989 | Halpern | |
| 4,882,675 A | 11/1989 | Nichtberger et al. | 364/401 |
| 4,893,333 A | 1/1990 | Baran et al. | |
| 4,906,826 A | 3/1990 | Spencer | 235/379 |
| 4,931,793 A | 6/1990 | Fuhrmann et al. | |
| 4,939,674 A | 7/1990 | Price et al. | |
| 4,948,174 A | 8/1990 | Thomson et al. | |
| 4,974,878 A | 12/1990 | Josephson | |
| 4,975,841 A | 12/1990 | Kehnemuyi et al. | |
| 4,977,501 A | 12/1990 | Lefevre | |
| 4,988,849 A | 1/1991 | Sasaki | |
| 4,992,646 A | 2/1991 | Collin | |
| 4,992,940 A | 2/1991 | Dworkin | |
| 5,007,084 A | 4/1991 | Materna et al. | |
| 5,023,904 A | 6/1991 | Kaplan | |
| 5,025,139 A | 6/1991 | Halliburton, Jr. | |
| 5,025,372 A | 6/1991 | Burton et al. | 364/406 |
| 5,053,607 A | 10/1991 | Carlson | |
| 5,054,096 A | 10/1991 | Beizer | |
| 5,072,380 A | 12/1991 | Randelman et al. | |
| 5,080,748 A | 1/1992 | Bonomi | |
| 5,097,115 A | 3/1992 | Ogasawara et al. | |
| 5,111,395 A | 5/1992 | Smith | |
| 5,117,355 A | 5/1992 | Mccarthy | 364/405 |
| 5,121,945 A | 6/1992 | Thomson et al. | |
| 5,122,950 A | 6/1992 | Benton | |
| 5,136,502 A | 8/1992 | Van Remortel et al. | |
| 5,173,851 A | 12/1992 | Off et al. | |
| 5,175,416 A | 12/1992 | Mansvelt et al. | 235/379 |
| 5,175,682 A | 12/1992 | Higashiyama | |
| 5,187,750 A | 2/1993 | Behera | |
| 5,192,947 A | 3/1993 | Neustein | 340/825.44 |
| 5,198,975 A | 3/1993 | Baker | |
| 5,202,826 A | 4/1993 | Mccarthy | 364/405 |
| 5,220,501 A | 6/1993 | Lawlor | |
| 5,224,034 A | 6/1993 | Katz et al. | |
| 5,225,978 A | 7/1993 | Petersen | |
| 5,237,159 A | 8/1993 | Stephens | |
| 5,237,620 A | 8/1993 | Deaton | |
| 5,257,486 A | 11/1993 | Holmwall | |
| 5,265,007 A | 11/1993 | Barnhard, Jr. et al. | |
| 5,276,311 A | 1/1994 | Hennige | |
| 5,283,829 A | 2/1994 | Anderson | |
| 5,287,268 A | 2/1994 | Mccarthy | 364/405 |
| 5,287,269 A | 2/1994 | Dorrough | |
| 5,297,026 A | 3/1994 | Hoffman | 364/408 |
| 5,305,196 A | 4/1994 | Deaton et al. | |
| 5,311,594 A | 5/1994 | Penzias | |
| 5,315,508 A | 5/1994 | Bain et al. | |
| 5,321,238 A | 6/1994 | Kamata | |
| 5,326,959 A | 7/1994 | Perazza | |
| 5,326,960 A | 7/1994 | Tannenbaum | 235/379 |
| 5,327,508 A | 7/1994 | Deaton et al. | |
| 5,336,870 A | 8/1994 | Hughes | |
| 5,339,239 A | 8/1994 | Manabe et al. | 364/401 |
| 5,349,170 A | 9/1994 | Kern | |
| 5,350,906 A | 9/1994 | Brody | |
| 5,351,187 A | 9/1994 | Hassett | |
| 5,352,877 A | 10/1994 | Morley | |
| 5,367,581 A | 11/1994 | Abel et al. | |
| 5,373,550 A | 12/1994 | Campbell | |
| 5,382,784 A | 1/1995 | Eberhardt | |
| 5,396,417 A | 3/1995 | Burks | |
| 5,397,881 A | 3/1995 | Mannik | 235/380 |
| 5,402,474 A | 3/1995 | Miller | |
| RE34,915 E | 4/1995 | Nichtberger et al. | 364/401 |
| 5,412,190 A | 5/1995 | Kopesec | |
| 5,413,341 A | 5/1995 | Lieberman | |
| 5,420,405 A | 5/1995 | Chasek | |
| 5,424,524 A | 6/1995 | Ruppert et al. | 235/462 |
| 5,424,938 A | 6/1995 | Wagner | |
| 5,428,684 A | 6/1995 | Akiyama et al. | |
| 5,430,644 A | 7/1995 | Deaton et al. | |
| 5,432,506 A | 7/1995 | Chapman | |
| 5,444,794 A | 8/1995 | Uhland, Sr. | |
| 5,444,841 A | 8/1995 | Glasser et al. | |
| 5,446,740 A | 8/1995 | Stratiagos | |
| 5,448,471 A | 9/1995 | Deaton et al. | |
| 5,450,477 A | 9/1995 | Amarant et al. | 379/93 |
| 5,459,482 A | 10/1995 | Orlen | |
| 5,465,206 A | 11/1995 | Hilt | |
| 5,471,669 A | 11/1995 | Lidman | 235/383 |
| 5,477,038 A | 12/1995 | Levine et al. | 235/380 |
| 5,477,040 A * | 12/1995 | Lalonde | 235/380 |
| 5,479,494 A | 12/1995 | Clitherow | |
| 5,479,532 A | 12/1995 | Abel | |
| 5,481,094 A | 1/1996 | Suda | |
| 5,482,139 A | 1/1996 | Rivalto | 186/36 |
| 5,483,445 A | 1/1996 | Pickering | |
| 5,484,988 A | 1/1996 | Hills | |
| 5,495,981 A | 3/1996 | Warther | |
| 5,500,514 A | 3/1996 | Veeneman et al. | 235/381 |
| 5,500,890 A | 3/1996 | Rogge et al. | |
| 5,502,576 A | 3/1996 | Ramsay et al. | |
| 5,504,677 A | 4/1996 | Pollin | |
| 5,506,691 A | 4/1996 | Bednar et al. | |
| 5,508,731 A | 4/1996 | Kohorn | |
| 5,511,114 A | 4/1996 | Stimson et al. | 379/114 |
| 5,513,250 A | 4/1996 | McAllister | |
| 5,521,363 A | 5/1996 | Tannenbaum | 235/379 |
| 5,530,232 A | 6/1996 | Taylor | 235/380 |
| 5,530,235 A | 6/1996 | Stefik et al. | 235/492 |
| 5,532,464 A | 7/1996 | Josephson et al. | |
| 5,532,689 A | 7/1996 | Bueno | |
| 5,537,314 A | 7/1996 | Kanter | |
| 5,541,583 A | 7/1996 | Mandelbaum | |
| 5,544,040 A | 8/1996 | Gerbaulet | |
| 5,544,043 A | 8/1996 | Miki et al. | |
| 5,544,046 A | 8/1996 | Niwa | |
| 5,544,086 A | 8/1996 | Davis et al. | 364/408 |
| 5,544,246 A | 8/1996 | Mandelbaum et al. | 380/23 |
| 5,550,734 A | 8/1996 | Tater | |
| 5,551,021 A | 8/1996 | Harada | |
| 5,557,515 A | 9/1996 | Abbruzzese et al. | |
| 5,563,400 A | 10/1996 | Le Roux | |
| 5,566,330 A | 10/1996 | Sheffield | |
| 5,568,489 A | 10/1996 | Yien | |
| 5,570,465 A | 10/1996 | Tsakanikas | |
| 5,572,004 A | 11/1996 | Raimann | |
| 5,577,109 A | 11/1996 | Stimson et al. | 379/112 |
| 5,578,808 A | 11/1996 | Taylor | 235/380 |
| 5,583,759 A | 12/1996 | Geer | |
| 5,583,760 A | 12/1996 | Klesse | |
| 5,585,787 A | 12/1996 | Wallerstein | 340/825.34 |

(56) References Cited

U.S. PATENT DOCUMENTS

| | | | |
|---|---|---|---|
| 5,590,038 A | 12/1996 | Pitroda | 395/241 |
| 5,590,196 A | 12/1996 | Moreau | |
| 5,590,197 A | 12/1996 | Chen | |
| 5,592,377 A | 1/1997 | Lipkin | |
| 5,592,378 A | 1/1997 | Cameron | |
| 5,598,557 A | 1/1997 | Doner et al. | 395/605 |
| 5,599,528 A | 2/1997 | Igaki | |
| 5,602,936 A | 2/1997 | Green et al. | |
| 5,603,025 A | 2/1997 | Tabb | |
| 5,608,785 A | 3/1997 | Kasday | 379/90 |
| 5,612,868 A | 3/1997 | Off et al. | |
| 5,615,109 A | 3/1997 | Eder | |
| 5,617,474 A | 4/1997 | Ditzig et al. | |
| 5,619,558 A | 4/1997 | Jheeta | |
| 5,621,201 A | 4/1997 | Langhans | |
| 5,621,787 A | 4/1997 | Mckoy et al. | 379/144 |
| 5,621,812 A | 4/1997 | Deaton et al. | |
| 5,625,767 A | 4/1997 | Bartell et al. | 395/140 |
| 5,637,845 A | 6/1997 | Kolls | 235/381 |
| 5,638,457 A | 6/1997 | Deaton et al. | |
| 5,640,577 A | 6/1997 | Scharmer | |
| 5,642,419 A | 6/1997 | Rosen | |
| 5,642,485 A | 6/1997 | Deaton et al. | |
| 5,644,723 A | 7/1997 | Deaton et al. | |
| 5,644,778 A | 7/1997 | Burks et al. | |
| 5,649,114 A | 7/1997 | Deaton et al. | |
| 5,649,117 A | 7/1997 | Landry | |
| 5,649,118 A | 7/1997 | Carlisle et al. | 395/241 |
| 5,652,786 A | 7/1997 | Rogers | |
| 5,653,914 A | 8/1997 | Holmes et al. | 252/301.16 |
| 5,659,165 A | 8/1997 | Jennings | |
| 5,659,469 A | 8/1997 | Deaton | |
| 5,659,741 A | 8/1997 | Eberhardt | |
| 5,664,110 A | 9/1997 | Green et al. | 705/26 |
| 5,666,493 A | 9/1997 | Wojcik et al. | |
| 5,675,607 A | 10/1997 | Alesio et al. | 379/114 |
| 5,677,521 A | 10/1997 | Garrou | |
| 5,677,955 A | 10/1997 | Doggett et al. | |
| 5,679,938 A | 10/1997 | Templeton | |
| 5,679,940 A | 10/1997 | Templeton | |
| 5,680,459 A | 10/1997 | Hook et al. | |
| 5,687,250 A | 11/1997 | Curley et al. | |
| 5,687,322 A | 11/1997 | Deaton et al. | |
| 5,689,100 A | 11/1997 | Carrithers et al. | 235/380 |
| 5,692,132 A | 11/1997 | Hogan | |
| 5,698,837 A | 12/1997 | Furuta | |
| 5,699,528 A * | 12/1997 | Hogan | 705/40 |
| 5,703,344 A | 12/1997 | Bezy et al. | |
| 5,704,044 A | 12/1997 | Tarter et al. | |
| 5,708,422 A | 1/1998 | Blonder et al. | |
| 5,710,886 A | 1/1998 | Christensen et al. | 395/214 |
| 5,710,889 A | 1/1998 | Clark et al. | |
| 5,715,298 A | 2/1998 | Rogers | |
| 5,715,314 A | 2/1998 | Payne | |
| 5,715,399 A | 2/1998 | Bezos | |
| 5,717,989 A | 2/1998 | Tozzoli et al. | |
| 5,721,768 A | 2/1998 | Stimson et al. | 379/114 |
| 5,724,424 A | 3/1998 | Gifford | |
| 5,727,153 A | 3/1998 | Powell | 395/214 |
| 5,727,249 A | 3/1998 | Pollin | |
| 5,748,780 A | 5/1998 | Stolfo | |
| 5,751,842 A | 5/1998 | Riach | |
| 5,757,917 A | 5/1998 | Rose et al. | |
| 5,758,328 A | 5/1998 | Giovannoli | 705/26 |
| 5,760,381 A | 6/1998 | Stich et al. | 235/380 |
| 5,765,141 A | 6/1998 | Spector | 705/14 |
| 5,770,843 A | 6/1998 | Rose et al. | |
| 5,774,553 A | 6/1998 | Rosen | |
| 5,777,305 A | 7/1998 | Smith et al. | 235/380 |
| 5,777,306 A | 7/1998 | Masuda | 235/380 |
| 5,783,808 A | 7/1998 | Josephson | |
| 5,784,696 A | 7/1998 | Melnikof | |
| 5,787,403 A | 7/1998 | Randle | |
| 5,787,404 A | 7/1998 | Fernandez-Holmann | 705/35 |
| 5,789,732 A | 8/1998 | McMahon et al. | |
| 5,793,861 A | 8/1998 | Haigh | |
| 5,794,221 A | 8/1998 | Egendorf | |
| 5,796,827 A | 8/1998 | Coppersmith et al. | |
| 5,802,498 A | 9/1998 | Comesanas | |
| 5,802,499 A | 9/1998 | Sampson et al. | |
| 5,819,236 A | 10/1998 | Josephson | |
| 5,819,238 A | 10/1998 | Fernholz | |
| 5,823,463 A | 10/1998 | Fissmann | |
| 5,826,241 A | 10/1998 | Stein | |
| 5,826,245 A | 10/1998 | Sandberg-Diment | |
| 5,832,090 A | 11/1998 | Raspotnik | |
| 5,832,447 A | 11/1998 | Rieker | |
| 5,832,457 A | 11/1998 | O'Brien | |
| 5,832,460 A | 11/1998 | Bednar | |
| 5,832,463 A | 11/1998 | Funk | |
| 5,832,464 A | 11/1998 | Houvener | |
| 5,832,476 A | 11/1998 | Tada et al. | 707/2 |
| 5,832,488 A | 11/1998 | Eberhardt | |
| 5,835,580 A | 11/1998 | Fraser | |
| 5,835,603 A | 11/1998 | Coutts | |
| 5,835,899 A | 11/1998 | Rose et al. | |
| 5,845,259 A | 12/1998 | West et al. | 705/14 |
| 5,852,811 A | 12/1998 | Atkins | |
| 5,852,812 A | 12/1998 | Reeder | |
| 5,857,079 A | 1/1999 | Claus et al. | 704/33 |
| 5,859,419 A | 1/1999 | Wynn | |
| 5,864,609 A | 1/1999 | Cross et al. | |
| 5,864,830 A | 1/1999 | Armetta et al. | 705/41 |
| 5,870,456 A | 2/1999 | Rogers | |
| 5,870,718 A | 2/1999 | Spector | 705/26 |
| 5,870,721 A | 2/1999 | Norris | |
| 5,870,723 A | 2/1999 | Pare | |
| 5,870,725 A | 2/1999 | Bellinger | |
| 5,873,072 A | 2/1999 | Kight | |
| 5,878,141 A | 3/1999 | Daly et al. | |
| 5,883,377 A | 3/1999 | Chapin, Jr. | |
| 5,883,810 A | 3/1999 | Franklin et al. | |
| 5,884,288 A | 3/1999 | Chang | |
| 5,884,290 A | 3/1999 | Smorodinsky et al. | |
| 5,897,625 A | 4/1999 | Gustin | |
| 5,898,157 A | 4/1999 | Mangili et al. | |
| 5,903,881 A | 5/1999 | Schrader | |
| 5,907,142 A | 5/1999 | Kelsey | |
| 5,910,896 A | 6/1999 | Hahn-Carlson | |
| 5,910,988 A | 6/1999 | Ballard | |
| 5,915,246 A | 6/1999 | Patterson et al. | |
| 5,917,965 A | 6/1999 | Cahill et al. | |
| 5,920,847 A | 7/1999 | Kolling et al. | |
| 5,926,800 A | 7/1999 | Baronowski et al. | 705/35 |
| 5,926,812 A | 7/1999 | Hilsenrath et al. | 705/5 |
| 5,928,082 A | 7/1999 | Clapper, Jr. | |
| 5,930,217 A | 7/1999 | Kayanuma | 369/59 |
| 5,930,778 A | 7/1999 | Geer | |
| 5,933,823 A | 8/1999 | Cullen et al. | 707/6 |
| 5,933,827 A | 8/1999 | Cole et al. | 707/10 |
| 5,940,811 A | 8/1999 | Norris | |
| 5,940,844 A | 8/1999 | Cahill | |
| 5,943,656 A | 8/1999 | Crooks | |
| 5,945,653 A | 8/1999 | Walker | |
| 5,949,044 A | 9/1999 | Walker et al. | |
| 5,950,174 A | 9/1999 | Brendzel | |
| 5,955,961 A | 9/1999 | Wallerstein | 340/825.33 |
| 5,956,700 A | 9/1999 | Landry | |
| 5,960,411 A | 9/1999 | Hartman et al. | |
| 5,963,659 A | 10/1999 | Cahill et al. | |
| 5,963,925 A | 10/1999 | Kolling et al. | |
| 5,966,698 A | 10/1999 | Pollin | |
| 5,970,469 A | 10/1999 | Scroggie et al. | |
| 5,970,475 A | 10/1999 | Barnes et al. | |
| 5,978,780 A | 11/1999 | Watson | |
| 5,982,370 A | 11/1999 | Kamper | 345/356 |
| 5,987,434 A | 11/1999 | Libman | |
| 5,987,435 A | 11/1999 | Weiss et al. | |
| 5,987,436 A | 11/1999 | Halbrook | |
| 5,987,439 A | 11/1999 | Gustin et al. | |
| 5,991,749 A | 11/1999 | Morrill, Jr. | |
| 5,991,750 A | 11/1999 | Watson | |
| 6,000,832 A | 12/1999 | Franklin et al. | |
| 6,002,767 A | 12/1999 | Kramer | |

(56) References Cited

U.S. PATENT DOCUMENTS

| | | | |
|---|---|---|---|
| 6,003,762 A | 12/1999 | Hayashida | |
| 6,006,205 A | 12/1999 | Loeb et al. | |
| 6,006,208 A | 12/1999 | Forst | |
| 6,009,442 A | 12/1999 | Chen et al. | |
| 6,014,634 A | 1/2000 | Scroggie et al. | |
| 6,014,636 A | 1/2000 | Reeder | |
| 6,014,645 A | 1/2000 | Cunningham | 705/38 |
| 6,016,482 A | 1/2000 | Molinari et al. | |
| 6,016,484 A | 1/2000 | Williams et al. | |
| 6,016,954 A | 1/2000 | Abe et al. | 235/379 |
| 6,018,718 A | 1/2000 | Walker et al. | |
| 6,026,388 A | 2/2000 | Liddy et al. | |
| 6,029,139 A | 2/2000 | Cunningham et al. | |
| 6,029,153 A | 2/2000 | Bauchner et al. | |
| 6,032,133 A | 2/2000 | Hilt et al. | |
| 6,032,134 A | 2/2000 | Weissman | |
| 6,032,136 A | 2/2000 | Brake, Jr. et al. | |
| 6,032,137 A | 2/2000 | Ballard | |
| 6,035,281 A | 3/2000 | Crosskey et al. | |
| 6,035,285 A | 3/2000 | Schlect et al. | |
| 6,035,287 A | 3/2000 | Stallaert et al. | |
| 6,036,099 A | 3/2000 | Leighton | |
| 6,038,552 A | 3/2000 | Fleischl et al. | |
| 6,038,553 A | 3/2000 | Hyde, Jr. | |
| 6,041,312 A | 3/2000 | Bickerton et al. | |
| 6,041,315 A | 3/2000 | Pollin | |
| 6,044,362 A | 3/2000 | Neely | |
| 6,045,039 A | 4/2000 | Stinson et al. | |
| 6,047,261 A | 4/2000 | Siefert | |
| 6,048,271 A | 4/2000 | Barcelou | |
| 6,052,674 A | 4/2000 | Zervides et al. | |
| 6,058,380 A | 5/2000 | Anderson et al. | |
| 6,058,381 A | 5/2000 | Nelson | |
| 6,061,665 A | 5/2000 | Bahreman | |
| 6,064,764 A | 5/2000 | Bhaskaran et al. | |
| 6,064,987 A | 5/2000 | Walker et al. | |
| 6,065,675 A | 5/2000 | Teicher | |
| 6,067,524 A | 5/2000 | Byerly et al. | |
| 6,070,150 A | 5/2000 | Remington et al. | |
| 6,070,798 A | 6/2000 | Nethery | |
| 6,073,104 A | 6/2000 | Field | |
| 6,073,113 A | 6/2000 | Guinan | |
| 6,076,072 A | 6/2000 | Libman | |
| 6,078,907 A | 6/2000 | Lamm | |
| 6,081,790 A | 6/2000 | Rosen | |
| 6,085,168 A | 7/2000 | Mori et al. | |
| 6,088,683 A | 7/2000 | Jalili | |
| 6,088,685 A | 7/2000 | Kiron et al. | |
| 6,088,686 A | 7/2000 | Walker et al. | |
| 6,092,056 A | 7/2000 | Tull, Jr. et al. | |
| 6,092,057 A | 7/2000 | Zimmerman et al. | |
| 6,098,053 A | 8/2000 | Slater | |
| 6,098,070 A | 8/2000 | Maxwell | |
| 6,101,479 A | 8/2000 | Shaw | |
| 6,105,007 A | 8/2000 | Norris | |
| 6,105,011 A | 8/2000 | Morrison, Jr. | |
| 6,108,639 A | 8/2000 | Walker et al. | |
| 6,108,641 A | 8/2000 | Kenna et al. | |
| 6,110,044 A | 8/2000 | Stern | |
| 6,111,858 A | 8/2000 | Greaves | |
| 6,115,690 A | 9/2000 | Wong | |
| 6,119,106 A | 9/2000 | Mersky et al. | |
| 6,119,107 A | 9/2000 | Polk | |
| 6,125,354 A | 9/2000 | MacFarlane et al. | |
| 6,128,599 A | 10/2000 | Walker et al. | |
| 6,128,602 A | 10/2000 | Northington et al. | |
| 6,128,603 A | 10/2000 | Dent et al. | |
| 6,129,273 A | 10/2000 | Shah | |
| 6,138,118 A | 10/2000 | Koppstein et al. | |
| 6,138,917 A | 10/2000 | Chapin, Jr. | |
| 6,144,946 A | 11/2000 | Iwamura | |
| 6,148,293 A | 11/2000 | King | |
| 6,149,055 A | 11/2000 | Gatto | |
| 6,149,056 A | 11/2000 | Stinson | |
| 6,173,272 B1 | 1/2001 | Thomas et al. | |
| 6,181,837 B1 | 1/2001 | Cahill et al. | |
| 6,182,059 B1 | 1/2001 | Angotti et al. | |
| 6,185,541 B1 | 2/2001 | Scroggie et al. | |
| 6,185,542 B1 | 2/2001 | Moran et al. | |
| 6,185,544 B1 | 2/2001 | Sakamoto et al. | |
| 6,188,309 B1 | 2/2001 | Levine | |
| 6,202,054 B1 | 3/2001 | Lawlor et al. | |
| 6,205,433 B1 | 3/2001 | Boesch et al. | |
| 6,213,391 B1 | 4/2001 | Lewis | |
| 6,223,168 B1 | 4/2001 | McGurl et al. | |
| 6,227,447 B1 | 5/2001 | Campisano | |
| 6,233,565 B1 | 5/2001 | Lewis et al. | |
| 6,233,566 B1 | 5/2001 | Levine et al. | |
| 6,236,972 B1 | 5/2001 | Shkedy | |
| 6,240,444 B1 | 5/2001 | Fin et al. | |
| 6,243,689 B1 | 6/2001 | Norton | |
| 6,267,292 B1 | 7/2001 | Walker et al. | |
| 6,278,981 B1 | 8/2001 | Dembo et al. | |
| 6,278,996 B1 | 8/2001 | Richardson et al. | |
| 6,282,516 B1 | 8/2001 | Giuliani | |
| 6,289,322 B1 | 9/2001 | Kitchen et al. | |
| 6,292,789 B1 | 9/2001 | Schutzer | |
| 6,301,379 B1 | 10/2001 | Thompson et al. | |
| 6,301,567 B1 | 10/2001 | Leong et al. | |
| 6,304,858 B1 | 10/2001 | Mosler et al. | |
| 6,305,603 B1 | 10/2001 | Grunbok, Jr. et al. | |
| 6,308,887 B1 | 10/2001 | Korman et al. | |
| 6,321,212 B1 | 11/2001 | Lange | |
| 6,324,524 B1 | 11/2001 | Lent et al. | |
| 6,327,575 B1 | 12/2001 | Katz | |
| 6,338,047 B1 | 1/2002 | Wallman | |
| 6,338,049 B1 | 1/2002 | Walker | |
| 6,341,724 B2 | 1/2002 | Campisano | |
| 6,343,279 B1 | 1/2002 | Bissonette et al. | |
| 6,344,108 B1 | 2/2002 | Von Medvey et al. | |
| 6,349,290 B1 | 2/2002 | Horowitz et al. | |
| 6,349,972 B1 | 2/2002 | Geiger et al. | |
| 6,351,735 B1 | 2/2002 | Deaton et al. | |
| 6,363,164 B1 | 3/2002 | Jones et al. | |
| 6,363,364 B1 | 3/2002 | Nel | |
| 6,363,365 B1 | 3/2002 | Kou | |
| 6,366,967 B1 | 4/2002 | Wagner | |
| 6,374,235 B1 | 4/2002 | Chen et al. | |
| 6,377,935 B1 | 4/2002 | Deaton et al. | |
| 6,390,362 B1 | 5/2002 | Martin | |
| 6,393,409 B2 | 5/2002 | Young et al. | |
| 6,405,173 B1 | 6/2002 | Honarvar et al. | |
| 6,405,181 B2 | 6/2002 | Lent et al. | |
| 6,409,593 B1 | 6/2002 | Petrecca | |
| 6,411,947 B1 | 6/2002 | Rice et al. | |
| 6,415,259 B1 | 7/2002 | Wolfinger et al. | |
| 6,418,419 B1 | 7/2002 | Nieboer et al. | |
| 6,418,420 B1 | 7/2002 | DiGiorgio et al. | |
| 6,418,430 B1 | 7/2002 | DeFazio et al. | |
| 6,424,949 B1 | 7/2002 | Deaton et al. | |
| 6,434,159 B1 | 8/2002 | Woodward et al. | |
| 6,446,072 B1 | 9/2002 | Schulze et al. | |
| 6,454,647 B1 | 9/2002 | Woodbury, Jr. | |
| 6,456,981 B1 | 9/2002 | Dejaeger et al. | |
| 6,460,020 B1 | 10/2002 | Pool et al. | |
| 6,485,922 B1 | 11/2002 | Erickson et al. | |
| 6,490,568 B1 | 12/2002 | Omara et al. | |
| 6,493,685 B1 | 12/2002 | Ensel et al. | |
| 6,513,019 B2 | 1/2003 | Lewis | |
| 6,535,896 B2 | 3/2003 | Britton et al. | |
| 6,536,663 B1 | 3/2003 | Lozier et al. | |
| 6,554,185 B1 | 4/2003 | Montross et al. | |
| 6,560,581 B1 | 5/2003 | Fox et al. | |
| 6,567,791 B2 | 5/2003 | Lent et al. | |
| 6,574,350 B1 | 6/2003 | Rhoads et al. | |
| 6,574,377 B1 | 6/2003 | Cahill et al. | |
| 6,578,000 B1 | 6/2003 | Dodrill et al. | |
| 6,578,015 B1 | 6/2003 | Haseltine et al. | |
| 6,607,127 B2 | 8/2003 | Wong | |
| 6,609,113 B1 | 8/2003 | O'Leary et al. | |
| 6,609,125 B1 | 8/2003 | Layne et al. | |
| 6,629,081 B1 | 9/2003 | Cornelius et al. | |
| 6,636,615 B1 | 10/2003 | Rhoads et al. | |
| 6,658,393 B1 | 12/2003 | Basch et al. | |

(56) References Cited

U.S. PATENT DOCUMENTS

| | | |
|---|---|---|
| 6,661,910 B2 | 12/2003 | Jones et al. |
| 6,704,714 B1 | 3/2004 | O'Leary et al. |
| 6,721,715 B2 | 4/2004 | Nemzow |
| 6,728,397 B2 | 4/2004 | McNeal |
| D490,840 S | 6/2004 | Arakaki et al. |
| D491,186 S | 6/2004 | Arakaki et al. |
| D491,953 S | 6/2004 | Arakaki et al. |
| D496,365 S | 9/2004 | Liu et al. |
| D498,236 S | 11/2004 | Liu et al. |
| 6,820,058 B2 | 11/2004 | Wood et al. |
| 6,824,066 B2 | 11/2004 | Weyant |
| 6,825,940 B1 | 11/2004 | Wu et al. |
| 6,856,973 B1 | 2/2005 | Bott |
| 6,860,375 B2 | 3/2005 | Hallowell et al. |
| 6,865,547 B1 | 3/2005 | Brake, Jr. et al. |
| 6,885,994 B1 | 4/2005 | Scroggie et al. |
| 6,886,046 B2 | 4/2005 | Stutz et al. |
| 6,892,187 B2 | 5/2005 | Phillips et al. |
| 6,912,502 B1 | 6/2005 | Buddle et al. |
| 6,942,569 B2 | 9/2005 | Petracca |
| 6,945,453 B1 | 9/2005 | Schwarz |
| 6,954,896 B1 | 10/2005 | Dodrill et al. |
| 6,961,710 B1 | 11/2005 | Yanagisawa et al. |
| 6,965,882 B1 | 11/2005 | Lapstun et al. |
| 6,970,259 B1 | 11/2005 | Lunt et al. |
| 6,970,830 B1 | 11/2005 | Samra et al. |
| 6,970,855 B2 | 11/2005 | Das et al. |
| RE38,957 E | 1/2006 | Laussermair et al. |
| 6,999,938 B1 | 2/2006 | Libman |
| 6,999,943 B1 | 2/2006 | Johnson et al. |
| 7,004,382 B2 | 2/2006 | Sandru |
| 7,014,110 B2 | 3/2006 | Minowa et al. |
| 7,024,374 B1 | 4/2006 | Day et al. |
| 7,025,256 B1 | 4/2006 | Drummond et al. |
| 7,039,600 B1 | 5/2006 | Meek et al. |
| 7,062,456 B1 | 6/2006 | Riehl et al. |
| 7,068,832 B1 | 6/2006 | Price et al. |
| 7,070,095 B1 | 7/2006 | Gandel et al. |
| 7,104,443 B1 | 9/2006 | Paul et al. |
| 7,133,846 B1 | 11/2006 | Ginter et al. |
| 7,159,116 B2 | 1/2007 | Moskowitz |
| 7,177,836 B1 | 2/2007 | German et al. |
| 7,194,437 B1 | 3/2007 | Britto et al. |
| 7,200,255 B2 | 4/2007 | Jones et al. |
| 7,228,155 B2 | 6/2007 | Saunders |
| 7,249,112 B2 | 7/2007 | Berardi et al. |
| 7,266,511 B2 | 9/2007 | Teshima |
| 7,277,870 B2 | 10/2007 | Mourad et al. |
| 7,287,009 B1 | 10/2007 | Liebermann |
| 7,312,707 B1 | 12/2007 | Bishop et al. |
| 7,313,543 B1 | 12/2007 | Crane et al. |
| 7,317,823 B1 | 1/2008 | Price et al. |
| 7,337,148 B2 | 2/2008 | Xie et al. |
| 7,349,884 B1 | 3/2008 | Odom |
| RE40,220 E | 4/2008 | Nichols et al. |
| 7,380,707 B1 | 6/2008 | Fredman |
| 7,401,048 B2 | 7/2008 | Rosedale et al. |
| 7,493,288 B2 | 2/2009 | Biship et al. |
| 7,536,354 B1 | 5/2009 | DeGroeve et al. |
| 7,546,272 B2 | 6/2009 | Loy |
| 7,587,363 B2 | 9/2009 | Cataline et al. |
| 2001/0011222 A1 | 8/2001 | McLauchlin et al. |
| 2001/0018666 A1 | 8/2001 | Sugiyama et al. |
| 2001/0018739 A1 | 8/2001 | Anderson et al. |
| 2001/0023415 A1 | 9/2001 | Keil |
| 2001/0027441 A1 | 10/2001 | Wankmueller |
| 2001/0032139 A1 | 10/2001 | Debonnett, Jr. |
| 2001/0034663 A1 | 10/2001 | Teveler et al. |
| 2001/0037300 A1 | 11/2001 | Miyazaki et al. |
| 2001/0037309 A1 | 11/2001 | Vrain |
| 2001/0038033 A1 | 11/2001 | Habib |
| 2001/0047334 A1 | 11/2001 | Nappe et al. |
| 2001/0047489 A1 | 11/2001 | Ito et al. |
| 2001/0051533 A1 | 12/2001 | Wietzke et al. |
| 2002/0012445 A1 | 1/2002 | Perry |
| 2002/0013728 A1 | 1/2002 | Wilkman |
| 2002/0016769 A1 | 2/2002 | Barbara |
| 2002/0023055 A1 | 2/2002 | Antognini et al. |
| 2002/0026394 A1 | 2/2002 | Savage et al. |
| 2002/0032651 A1 | 3/2002 | Embrey |
| 2002/0038363 A1 | 3/2002 | MacLean |
| 2002/0046169 A1 | 4/2002 | Keresman, III et al. |
| 2002/0047316 A1 | 4/2002 | Chitayat |
| 2002/0052842 A1 | 5/2002 | Schuba et al. |
| 2002/0055907 A1 | 5/2002 | Pater et al. |
| 2002/0069134 A1 | 6/2002 | Solomon |
| 2002/0072976 A1 | 6/2002 | Virtanen et al. |
| 2002/0077978 A1 | 6/2002 | O'Leary et al. |
| 2002/0082962 A1* | 6/2002 | Farris et al. .................... 705/35 |
| 2002/0082985 A1 | 6/2002 | MacKay |
| 2002/0084321 A1 | 7/2002 | Martens et al. |
| 2002/0087415 A1 | 7/2002 | Allen et al. |
| 2002/0087468 A1 | 7/2002 | Ganesan et al. |
| 2002/0087469 A1 | 7/2002 | Ganesan et al. |
| 2002/0091635 A1 | 7/2002 | Dilip et al. |
| 2002/0099586 A1 | 7/2002 | Bladen et al. |
| 2002/0100803 A1 | 8/2002 | Sehr |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0128981 A1 | 9/2002 | Kawan et al. |
| 2002/0129221 A1 | 9/2002 | Borgia et al. |
| 2002/0133461 A1 | 9/2002 | Ramachandran |
| 2002/0138390 A1 | 9/2002 | May |
| 2002/0138398 A1 | 9/2002 | Kalin et al. |
| 2002/0145039 A1 | 10/2002 | Carroll |
| 2002/0156723 A1 | 10/2002 | Lilly et al. |
| 2002/0169658 A1 | 11/2002 | Adler |
| 2002/0170966 A1 | 11/2002 | Hannigan et al. |
| 2002/0178071 A1 | 11/2002 | Walker et al. |
| 2002/0184151 A1 | 12/2002 | Maloney |
| 2002/0194081 A1 | 12/2002 | Perkowski |
| 2002/0194096 A1 | 12/2002 | Falcone et al. |
| 2002/0198817 A1 | 12/2002 | Dhir |
| 2002/0199182 A1 | 12/2002 | Whitehead |
| 2003/0018557 A1 | 1/2003 | Gilbert et al. |
| 2003/0018567 A1 | 1/2003 | Flitcroft et al. |
| 2003/0028481 A1 | 2/2003 | Flitcroft et al. |
| 2003/0037002 A1 | 2/2003 | Higgins et al. |
| 2003/0040927 A1 | 2/2003 | Sato et al. |
| 2003/0040959 A1 | 2/2003 | Fei et al. |
| 2003/0046218 A1 | 3/2003 | Albanese et al. |
| 2003/0055675 A1 | 3/2003 | Klein Twennaar |
| 2003/0065805 A1 | 4/2003 | Barnes, Jr. |
| 2003/0069780 A1 | 4/2003 | Hailwood et al. |
| 2003/0097335 A1 | 5/2003 | Muskowitz et al. |
| 2003/0100803 A1 | 5/2003 | Lu et al. |
| 2003/0105641 A1 | 6/2003 | Lewis |
| 2003/0110070 A1 | 6/2003 | De Goeij |
| 2003/0110136 A1 | 6/2003 | Wells et al. |
| 2003/0110442 A1 | 6/2003 | Battle |
| 2003/0120686 A1 | 6/2003 | Kim et al. |
| 2003/0130919 A1 | 7/2003 | Templeton et al. |
| 2003/0130945 A1 | 7/2003 | Force et al. |
| 2003/0130952 A1 | 7/2003 | Bell et al. |
| 2003/0144942 A1 | 7/2003 | Sobek |
| 2003/0187787 A1 | 10/2003 | Freund |
| 2003/0187789 A1 | 10/2003 | Karas et al. |
| 2003/0191710 A1 | 10/2003 | Green et al. |
| 2003/0200107 A1 | 10/2003 | Allen et al. |
| 2003/0208421 A1 | 11/2003 | Vicknair et al. |
| 2003/0208441 A1 | 11/2003 | Poplawski et al. |
| 2003/0213843 A1 | 11/2003 | Jackson |
| 2003/0217005 A1 | 11/2003 | Drummond et al. |
| 2003/0217329 A1 | 11/2003 | Good |
| 2003/0218066 A1 | 11/2003 | Fernandes et al. |
| 2003/0225663 A1 | 12/2003 | Horan et al. |
| 2003/0229525 A1 | 12/2003 | Callahan et al. |
| 2003/0233305 A1 | 12/2003 | Solomon |
| 2003/0236747 A1 | 12/2003 | Sager |
| 2003/0237046 A1 | 12/2003 | Parker et al. |
| 2004/0010465 A1 | 1/2004 | Michalski et al. |
| 2004/0019605 A1 | 1/2004 | Keown et al. |
| 2004/0029569 A1 | 2/2004 | Khan et al. |

(56) References Cited

U.S. PATENT DOCUMENTS

| | | |
|---|---|---|
| 2004/0039691 A1 | 2/2004 | Barratt et al. |
| 2004/0049451 A1 | 3/2004 | Berardi |
| 2004/0049456 A1 | 3/2004 | Dreyer |
| 2004/0064409 A1 | 4/2004 | Kight et al. |
| 2004/0078328 A1 | 4/2004 | Talbert et al. |
| 2004/0094624 A1 | 5/2004 | Fernandes et al. |
| 2004/0133516 A1 | 7/2004 | Buchanan et al. |
| 2004/0149544 A1 | 8/2004 | Dal Ferro |
| 2004/0159700 A1 | 8/2004 | Khan et al. |
| 2004/0201735 A1 | 10/2004 | Baron |
| 2004/0210498 A1 | 10/2004 | Freund |
| 2004/0228514 A1 | 11/2004 | Houle et al. |
| 2004/0232223 A1 | 11/2004 | Beenau et al. |
| 2004/0236688 A1 | 11/2004 | Bozeman |
| 2004/0239481 A1 | 12/2004 | Beenau |
| 2004/0242308 A1 | 12/2004 | Gray |
| 2004/0252012 A1 | 12/2004 | Beenau et al. |
| 2004/0254837 A1 | 12/2004 | Roshkoff |
| 2004/0260607 A1 | 12/2004 | Robbins et al. |
| 2005/0021466 A1 | 1/2005 | Buchanan et al. |
| 2005/0033619 A1 | 2/2005 | Barnes et al. |
| 2005/0033690 A1 | 2/2005 | Antognini et al. |
| 2005/0035847 A1 | 2/2005 | Bonalle et al. |
| 2005/0040242 A1 | 2/2005 | Beenau et al. |
| 2005/0055254 A1 | 3/2005 | Schmidtberg et al. |
| 2005/0077349 A1 | 4/2005 | Bonalle et al. |
| 2005/0086178 A1 | 4/2005 | Xie et al. |
| 2005/0091156 A1 | 4/2005 | Hailwood et al. |
| 2005/0097046 A1 | 5/2005 | Singfield |
| 2005/0097050 A1 | 5/2005 | Orcutt |
| 2005/0114883 A1 | 5/2005 | Nagai et al. |
| 2005/0116024 A1 | 6/2005 | Beenau et al. |
| 2005/0144059 A1 | 6/2005 | Schuessler |
| 2005/0167488 A1 | 8/2005 | Higgins et al. |
| 2005/0171898 A1 | 8/2005 | Bishop et al. |
| 2005/0177480 A1 | 8/2005 | Huang |
| 2005/0179251 A1 | 8/2005 | Wagoner et al. |
| 2005/0189427 A1 | 9/2005 | Brown et al. |
| 2005/0209954 A1 | 9/2005 | Asher et al. |
| 2005/0216888 A1 | 9/2005 | Drummond et al. |
| 2005/0228751 A1 | 10/2005 | Keown et al. |
| 2005/0261955 A1 | 11/2005 | Humble et al. |
| 2005/0289051 A1 | 12/2005 | Allin et al. |
| 2006/0036553 A1 | 2/2006 | Gupta et al. |
| 2006/0039733 A1 | 2/2006 | Meyerhofer |
| 2006/0041540 A1 | 2/2006 | Shannon |
| 2006/0095358 A1 | 5/2006 | Viarengo et al. |
| 2006/0106650 A1 | 5/2006 | Bush |
| 2006/0106717 A1 | 5/2006 | Randle et al. |
| 2006/0136335 A1 | 6/2006 | Ferguson, III |
| 2006/0161501 A1 | 7/2006 | Waserstein et al. |
| 2006/0167989 A1 | 7/2006 | Bashen et al. |
| 2006/0178986 A1 | 8/2006 | Giordano et al. |
| 2006/0206427 A1 | 9/2006 | Love et al. |
| 2006/0259390 A1 | 11/2006 | Rosenberger |
| 2006/0282389 A1 | 12/2006 | Gupte |
| 2006/0287953 A1 | 12/2006 | Chauhan |
| 2007/0005498 A1 | 1/2007 | Cataline et al. |
| 2007/0138255 A1 | 6/2007 | Carreon et al. |
| 2007/0265924 A1 | 11/2007 | Schwarz |
| 2007/0288334 A1 | 12/2007 | Creedle et al. |
| 2008/0010202 A1 | 1/2008 | Schwarz |
| 2008/0116283 A1 | 5/2008 | Newbrough et al. |
| 2008/0193008 A1 | 8/2008 | Mount et al. |
| 2009/0043651 A1 | 2/2009 | Schwarz |

FOREIGN PATENT DOCUMENTS

| | | |
|---|---|---|
| EP | 0917119 | 5/1999 |
| EP | 1014318 | 6/2000 |
| JP | 2001-266039 | 9/2001 |
| JP | 2002-24618 | 1/2002 |
| JP | 2002-056063 | 2/2002 |
| JP | 2002-083241 | 3/2002 |
| JP | 2002-087536 | 3/2002 |
| JP | 2002-508547 | 3/2002 |
| JP | 2002-140505 | 5/2002 |
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 96/12242 A1 | 4/1996 |
| WO | WO 97/14108 | 4/1997 |
| WO | WO 97/45796 | 12/1997 |
| WO | WO 97/45814 | 12/1997 |
| WO | WO 98/09260 | 3/1998 |
| WO | WO 99/10823 | 3/1999 |
| WO | WO 00/39979 | 7/2000 |
| WO | WO 01/35355 | 5/2001 |
| WO | WO 01/43084 | 6/2001 |
| WO | WO 01/75730 A2 | 10/2001 |
| WO | WO 02/063432 A2 | 8/2002 |
| WO | WO 2004/079603 | 9/2004 |

OTHER PUBLICATIONS (Michael Miller, The complete Idiot's Guide to Ebay Online Auctions, copyright Jul. 1999).*

PayPal (How PayPal.com works, www.paypal.com/cgi-bin/webscr?cmd=paypal-works Jul. 2000).*

"Here's the call convenience you asked for: 1-800-call-ATT . . . For All Calls," AT&T Universal Platinum MasterCard and Calling Card publication, 1998, pp. 1-7, author unknown.

"Amex prepaid offering is latest card for firms rewarding employees," American Express Co.'s employee incentive funds card product announcement, Feb. 9, 1999, Dialog(R) File 148: Trade & Industry Database, Lisa Fickenscher, American Banker, v161, n151, p. 11(1)Aug. 8, 1996, pp. 1-2.

"Associates First Capital Corporation," The Industry Standard Company Capsules website, Hoover's Company Capsule, Apr. 6, 1999, pp. 1-2.

"Boatmen's Floats Stored Value Into the Employee Incentive Waters," Debit Card News, vol. 2, Issue 2, Jul. 16, 1996, puglished by Faulkner & Gray, Inc., pp. 1-3.

"Boatmen's Prepaid Cards for Worker-Incentive Firm," by Mickey Meece, Dialog(R) File 16:PROMT(R), The Gale Group, Jul. 2, 1996, 1 page.

"CardEx Incentives," website http://www.cardex.com/about.htm, Apr. 6, 1999, 14 pages.

"Cards on the Internet—Advertising on a $3 Bill," Industry Intelligence, by Gerry Vandenengel, no date available, pp. 46-48.

"Cash, check, charge—what's next?," published on Mar. 6, 1995 in the Seattle Times, by David Bank, 4 pages.

"Cash just isn't flexible enough : Shops of the future will only take cards," Technology Express Section of the Daily Express, Feb. 10, 1995 by Nick Rosen, 1 page.

"Debit Cards Seem Poised for New Markets," published in the American Banker on Mar. 7, 1995, by Beth Piskora, 1 page.

"D.C. Area Safeway Stores Look for Increase in Sales Volume and Revenue With Cards," Card News Phillips Publishing, Inc., vol. 6, No. 25 ISSN: 0894-0797, Dec. 30, 1991, 3 pages.

"Incentives Field Moving to Card-Based Awards Series: 14," American Banker, by Antoinette Coulton, Mar. 26, 1998, 3 pages.

"Electronic Payments and Internet commerce," H.W. Wilson Co., Record No. BWBA97056650 (The evolution of a new consumerism), Chain Store Age (Chain Store Age) v. 73 (Jun. 1997 supp), 3 pages.

"First USA Platinum Connect," Calling card application offered by First USA, 6 pages.

"Introducing the First USA Platinum Connect card," offered by First USA, 6 pages.

"The Gift of Credit," by Stephanie Stoughton, date unavailable, 1 page.

"Incentive Firms Find Debit Cards a Rewarding Experience," Debit Card News, vol. 3, No. 11, Nov. 28, 1997, 3 pages.

"Stuck for a gift? Give a prepaid Credit Card," bankrate.com website by Lucy Lazarony of bankrate.com—posted Dec. 21, 1998, 4 pages.

"Universal Card free lifetime membership extended 3 months," News Release dated Dec. 4, 1990, AT&T, 4 pages.

(56) References Cited

OTHER PUBLICATIONS

"Microsoft, Visa to Jointly Develop PC Electronic-Shopping Software," by Don Clark staff reporter of the Wall Street Journal, Nov. 9, 1994, 3 pages.
"Introducing Spending Money," A new card product concept presented to First USA, Oct. 9, 1996, Annetta Marketing & Design, 15 pages.
"More retailers turn to co-branding (store credit cards linked to bank)," Chain Store Age Executive with Shopping Center Age, vol. 71, No. 2, ISSN: 0193-1199, Feb. 1, 1995, 3 pages.
"Welcome to Swift Gift," website, http:www.swiftgiftcard.com, Dec. 8, 1998, 11 pages.
"Sopininmon! Or what's happening in the retail credit card environment?," Credit World, vol. 85, No. 4, Mar. 1, 1997, by Ralph E. Spurgin, pp. 1-7.
"A Store Card Issuer Looks for Lift from Electronic Gift Certificates," Credit Card News, p. 4, Feb. 1, 1995, published by Faulker & Gray, 2 pages.
"Stored value cards: costly private substitutes for government currency," Economic Quarterly, vol. 82, No. 3, p. 1(25), Summer 1996, by Jeffrey M. Lacker, 17 pages.
"The SwiftGift," KeyBank Holiday Offer, Apr. 5, 1999, 12 pages.
"Maritz Gets Mastercard's Stamp of Approval: Has signed a marketing deal with MasterCard," Business Travel News, Aug. 19, 1996, by Stefani O'Connor, 2 pages.
"New 1-800-CALL-ATT campaign promotes one number for all calls," AT&T News Release on AT&T website http://www.att.com/press/0297/970217.csa.html, Jun. 13, 2000, pp. 1-2.
eCharge; Friday, Dec. 3, 1999; © 1999 eCharge Corporation; All rights reserved.
"Swift Gift 'Wows' Internet Shoppers"; PR Newswire; copyright (c) 1998, PR Newswire; Weds., Dec. 2, 1998; 22 pages.
"Credit Cards—Our Cards—at Associates National Bank (Delaware)"; www.theassociates.com/consumer/credit_cards/our_cards.html; printed Apr. 6, 1999; 7 pages.
"Cash Card Creator Looking Beyond Mondex"; by Jeffrey Kutler; Thurs. Feb. 9, 1995; 1 page.
"Check Free—The way Money Moves on the Web"; www.checkfree.com; printed Mar. 22, 2001; 12 pages.
"Paytrust®—Complete Bill Management"; www.paytrust.com/htmlu/index.asp; printed Jan. 26, 2001; 22 pages.
"Quicken.com—Is the Financial Race Stressing you out?"; bills.quicken.com/welcome; printed Jan. 26, 2001; 12 pages.
"Paymentech—Payment Solutions for Business"; Paymentech, www.paymentech.com; printed Jan. 26, 2001; 15 pages.
"Visa ePay 'A Fully Electronic Solution for Biller Payment Delivery'"; www.visa.com/fb/epay/ printed Jan. 26, 2001; 5 pages.
"PayPal 'The Way to Send and Receive Money Online'"; www.paypal.com; printed Jan. 26, 2001; 8 pages.
Discover® Card: Test Drive: Smart Check; Looking for the Fastest and Easiest Way . . . ; www.discovercard.com/discover/data/account/testdrive/smartchk_body.shtml; printed Jan. 26, 2001; 1 page.
Visa & Carnegie Mellon Plan Online Payment Scheme, Newsbyte News Network, Feb. 15, 1995.
PCT-International Search Report dated Sep. 17, 2002 for Application No. PCT/US02/02526, filed Jan. 30, 2002.
Kutler, A Different Drummer on the Data Highway, American Banker, May 12, 1995, 2 pages.
Epper, A Player Goes After Big Bucks in Cyberspace, American Banker, May 5, 1995, 1 page.
Associates National Bank (DE) Credit Card Services, The Associates, www.theassocitheassociates.atescomcorn/consumer/credit_cards/rnain.html, Apr. 6, 1999, 6 pages.
Aversion Therapy: Banks Overcoming Fear of the Net to Develop Safe Internet-based Payment System w/ Netscape Communicator, Network World, Dec. 12, 1994, 1 page.
Kutler, Cash Card Creator Looking Beyond Mondex, Feb. 9, 1995, 1 page.
Bank, Cash, Check, Charge—What's Next?, Seattle Times, Mar. 6, 1998, 4 pages.
Chester, Cross-platform integration with XML and SOAP, Oct. 2001.
Mitchell, Cyberspace: Crafting software that will let you build a business out there, Business Week, pp. 78-86, Feb. 27, 1995.
Strassel, Dutch Software Concern Experiments with Electronic 'Cash' in Cyberspace, Wall Street Journal, Apr. 17, 1995, 1 page.
Post, E-Cash: Can't Live With It, Can't Live Without It, The American Lawyer, pp. 116-117, Mar. 1, 1996.
eCharge, eCharge Corporation, www.echarge.com, Dec. 3, 1999, 12 pages.
Getting Smart with Java: Sun. Micro Says American Express to Use Java for Smart Card, Reuters, www.abcnew.go.com/sciences/tech, Jun. 6, 2000, 2 pages.
Harris InfoSource, Apr. 26, 1999, 12 pages.
Knowles, Improved Internet Security Enabling On-Line Commerce, PC Week, Mar. 20, 1995, 4 pages.
Meredith, Internet bank moves closer to virtual reality, USA Today, May 5, 1995, 1 page.
JAVA™ Technology in the Real World, JAVA, java.sun.com, May 21, 1999, 7 pages.
Clark, Microsoft, Visa to Jointly Develop PC Electronic-Shopping Software, The Wall Street Journal, B9, Nov. 9, 1994, 3 pages.
Sirbu et al., NetBill: An Internet Commerce System Optimized for Network Delivered Services, http://www.ini.cmu.edu :80/netbill, pp. 1-12, Feb. 27, 1995, 12 pages.
Mitchell, Netlink Goes After an Unbanked Niche, wysiwyg://0/http://www.dialogclassic.com/history, ISSN: 1093-1279, Sep. 1999.
SmartAxis, Load Cash on to Your E-Purse Card, Supported Currencies and Schemems, http://www.smartaxis.co.uk/seller/howitworks.html, printed Feb. 23, 2001.
The check is in the email., Information Today, vol. 12, No. 3, Mar. 1, 1995, ISSN: 8755-6286, 4 pages.
Fujimura et al., XML Voucher: Generic Voucher Language, Internet Draft, Trade Working Group, www.ietf.org, Feb. 2003.
Singer, Yahoo!, HSBC Ally on Online Payment, siliconvalley.internet.com/news/article.php/856791, Jul. 30, 2001, 1 page.
Dialog file 20, #10279554.
Annual Report Pursuant to Sectin 13 or 15(d) of The Securities Exchange Act of 1934, Form 10-K, Intelidata Technologies Corporation, Fiscal Year Ended Dec. 31, 2001.
Blockbuster running test of a stored value card, The American Banker, Sep. 1, 1995.
CES/NaBANCO introduces stored value card technology blockbuster video is first merchant partner, Business Wire, Inc., Jan. 15, 1996.
Card Flash Daily Payment Card News, www.cardweb.com, printed Sep. 23, 2004.
Anonymous, Chase Manhattan introduces new FEDI payables product, ProQuest document ID: 7806951, ISSN/ISBN: 02686635, May 1995.
Bills, Chase Pact Done, What's Next for Web Vendors?, The American Banker, Technology Section, Jun. 3, 2002, p. 23.
Reinbach, Chase steps up treasury system, ProQuest documednt ID 8723558, ISSN/ISBN: 10459472, Nov. 1995.
Anonymous, Chasing the global trend, Cash Management News, proQuest document ID 9319923, ISSN/ISBN: 02686635, Dec. 1995.
Malhotra, Clearing House Enumerates e-Payments Ills, The American Banker, vol. 167, No. 154, Aug. 23, 2002.
Marjanovic, Corporate Services: Chase Gears Up Global Payments System Series: 16, The American Banker, vol. 160, Issue 174, Sep. 11, 1995, p. 41.
Gluck, Creating a Global Cash-Management Game Plan, Bank Systems & Technology, Feb. 1997, p. 28.
Lamond, Credit Card Transactions Real World and Online, Paying by Credit Card-Real World and Online, http://www.virtualschool.edu/mon/ElectronicProperty/klamond/credit, printed Jul. 8, 2005, 17 pages.
Lamond, Keith, Credit Card Transactions Real World and Online, http://www.virtualschool.edu/mon/ElectronicProperty/klamond/credit_card.htm, pp. 1-17.
Dialog file 20, #10279554; Offer: Book Yourself Free Cassettes; Mar. 25, 2000; Birmingham Post, p. 16.
Du Pont's Electronic Payments, Corporate EFT Report, v9, n1, Dialog file 636, Accession No. 01066902, Jan. 11, 1989.

(56) References Cited

OTHER PUBLICATIONS

Carreker, Electronic check presentment: Capturing new technology, http://proquest.umi.com, Banking Management, Rolling Meadows: vol. 71, Issue 2, Mar./Apr. 1995, p. 32, 5 pages.
Fidelity Helps Fund Sellers Trim the Taxes They'll Owe, The Wall Street Journal, Nov. 7, 2002.
First Data markets stored-value cards, Cards International, Jan. 30, 1996, p. 5.
Norris, First data unit develops blockbuster cash card, Omaha World Hearld Sunrise Edition, Business Section, Jan. 19, 1996, p. 16.
Harsh Truth: Your Investments Likely Won't Make Any Money. Money, Initial Launch to 200 Credit Unions, USA Today.com, Jun. 27, 2002.
Decovny, Net Scope, Banking Technology, May 1997.
Nokia Announces the World's First NFC Enabled Mobile Product for Contactless Payment and Ticketing, PRNewswire, Feb. 9, 2005.
Goode, On Profit, Loss and the Mysteries of the Mind, The New York Times, Nov. 5, 2002.
Anonymous, Operating in a multi-currency environment, ProQuest document ID 9215937, ISSN/ISBN 09589309, Oct. 1995.
Maher and Troutman, Payor's Prescription for Painless Migration to Electronic Healthcare Payments and Remittance Advices, PNC Bank, Dec. 2001.
Press Release, Mar. 5, 2004, Payment Data Systems Files Patent on Debit Card Payment Solution, American City Business Journals, Inc., Mar. 5, 2004.
Maher and Troutman, Provider's Prescription for Painless Migration to Receipt of Electronic Healthcare Payments and Remittance Advices, PNC Bank, Dec. 2001.
Anonymous, Systems spell change for foreign exchange, Global Investor, ProQuest document ID 1056152B, ISSN/ISBN: 09513604, Nov. 1996.
French, Tech Stocks: Market Movers, Investors Worry CheckFree Being Chased from Its Own Game, http://www.thestreet.com, Jun. 20, 2002.
Technology, In Brief Wachovia-InteliData Deal, May 7, 2002.
Zuckerman, The Hedge-Fund Craze, The Wall Street Journal, Jun. 12, 2002.
McDonald, The Stars in the Sky Flicker, and Fund Stars Do the Same, The Wall Street Journal, Jan. 15, 2003.
Anonymous, Visa & Carnegie Mellon Plan Online Payment Scheme, Newsbyte News Network, Feb. 15, 1995.
Financial News, Wells Fargo Rolls Out Nationwide Lockbox Check Conversion, PR Newswire Association, Apr. 22, 2003.
Terrie Miller and Henry Yan, When Custody Governs, Benefits Canada, Toronto, Feb. 1998, vol. 22, Issue 2, p. 33, 5 pages.
Hunt, Robert M., An Introduction to the Economics of Payment Card Networks.
Armstrong, Douglas, Norwest eases difficulty of Interstate banking Bank's customers may use the same account number at any branch.
Maturi, Richard, Personal Finance; When you Need to Send Cash in a Flash.
Unknown, ABA Banking Journal; The front end and back end functions of item processing will benefit from the technological advances of imaging; Mar. 1990; acs01038997.
Arend, Mark; Bank applications fuel optical storage market; ABA Banking Journal; Oct. 1991; acs01039000.
Unknown, Alabama department of revenue selects Unisys for imaging solution to speed tax returns, save taxpayers money; Sep. 6, 1995; acs01039064.
Unknown, BancTec selects alchemy CD-Based archival solution for remittance processing system; May 6, 1998; acs01039047.
Keeton, Ann, Bank of America completes its rollout of 'paperless' processing of payments; Nov. 1, 1999; acs01039334.
Stanley, Susan et al., Bank of America provides nationwide image lockbox services; Oct. 20, 1999; acs01039405.
Business Wire; 1A Corp. wins contract with comerica to install the first digital all items archive, one of nation's top 25 bank holding companies expects to streamline operations . . . ; Jan. 9, 1997; acs01039033.
Business Wire; IA Corp. shows complex transaction processing software Work vision at AIIM, plus Check Vision and Remit Vision application frameworks for new advanced banking services . . . ; Apr. 14, 1997; acs01039025.
Business Wire; Shawnut bank provides lockbox customers real-time, on-line electronic exception processing, 1A Corp's image-based lockbox system cuts processing time from days to minutes . . . ; Jan. 9, 1996; acs01039031.
Unknown, Business Wire; State of Minnesota using AT&T imaging solution . . . ; Apr. 18, 1994; acs01039027.
Unknown, Caere introduces the Model 1800 document remittance processor; compact unit provides cost effective means for low to medium speed document processing; Oct. 19, 1995; acs01039057.
Malyykhina, Elena, Cell Phone Software Formats Checks for Online Banking; InformationWeek; Jan. 24, 2008.
Lupo, Lisa Selkin, Chase image-enables NY wholesale lockbox facility with VICOR technology; Aug. 31, 1999; acs01039406.
Anonymous, Chase offers image lockbox for Europe; Aug. 1997; acs01039336.
Unknown, Crestar to introduce new advanced cash management system based on IA Corp. software; New system will be industry's first, . . . ; Oct. 28, 1996; acs01039059.
Unknown, DMP and IMR Partner to develop electronic archiving solution for wholesale Lockboxes and remittance processing; Mar. 24, 1998; acs01039040.
Matyas, Stephen M., Digital Signatures—An Overview; pp. 87-94; 1979.
Friis, M. William; Goodbye to paper?; ABA Banking Journal, Mar. 1989; acs01037874.
Unknown, IA Corp. announces new CheckVision products; new CheckVision archive software supports short; Apr. 1, 1996; acs01039339.
Unknown, IA Corporation becomes a major player in image-based cash management solutions; Nov. 24, 1995; acs01039052.
Unknown, IA announces installation at QuestPoint of first client/server cash management system with check image storage compatible with IBM, NCR and Unisys; May 29, 1997; acs01039044.
Unknown, IA presents new advanced cash management software at TMA to link banks and their corporate customers; full suite of cash management products allow banks to offer treasury . . . ; Nov. 18, 1996; acs01039049.
Unknown, IA's remit vision adopted by Harris Bank for CD-ROM and online customer viewing of check and remittance documents; continues banking industry trends to use image-based processing as strategic weapon . . . ; May 28, 1996; acs01039042.
IEM Product Description; ACS01066106.
Fitch, Thomas P., Image technology brings lockbox breakthroughs; Sep. 1995; acs01039344.
Andersen Consulting, Image-based transaction processing; The banking industry's challenge for the 1990s and beyond; 1989; acs01039270.
Tauhert, Christy, Lock box solutions reengineer payments; Aug. 1996; acs01039337.
Mead, Wendy S.; Two Banks' Imaging Deals Target Fee Revenue Increases; The American Banker; May 9, 1997; acs01039019.
Moyer, Liz; Bank of Montreal to Install Imaging System by Unisys for Retail Lockbox Services; The American Banker; Oct. 22, 1996; acs01039023.
Moyer, Liz; KeyCorp joins trend to check imaging for lockbox; The American Banker; Aug. 23, 1996; acs01039004.
Unknown, NCR introduces 7780 item processing system; image-based system scans and reads documents; Mar. 11, 1992; acs01039038.
Marjanovic, Steven, NationsBank offers lockbox imaging; Jul. 3, 1995; acs01039350.
Unknown, NationsBank rolls out first wholesale lockbox imaging; Aug. 3, 1995; acs01039351.
Shannon, John, New lockbox platform due out at NationsBank; Feb. 1998; acs01039384.
Buckley, JP. et. al., Processing Noisy Structured Textual Data Using a Fuzzy Matching Approach Application to Postal Address Errors; XP-001132075; pp. 195-205 (11 pages); Dec. 2000.

(56) References Cited

OTHER PUBLICATIONS

Schutzer, Daniel; Get ready for electronic commerce; ABA Banking Journal; Jun. 1995; acs01038994.

Jensen, Cindy, U.S. Bank effectively manages complexity; May/Jun. 2006; acs01039402.

Jensen, Cindy, U.S. bank effectively manages complexity; May/Jun. 2006 acs01039398.

Jensen, Cindy, U.S. bank effectively manages complexity; May/Jun. 2006 acs01039400.

Unknown, Wholesale lockbox imaging; Feb. 1, 1993; acs01039331.

* cited by examiner

SYSTEM AND METHOD FOR ELECTRONIC BILL PAY AND PRESENTMENT

CROSS REFERENCE TO RELATED APPLICATION

This application claims priority from U.S. provisional application Ser. No. 60/264,681 filed Jan. 30, 2001, having one or more of the same inventors as this application, assigned or under an obligation of assignment to the same entity as this application, and which application is incorporated herein by reference.

FIELD OF INVENTION

The invention relates to the field of financial systems, and more particularly to enabling an individual consumer or other entity to pay bills on a network-based application using a credit account.

BACKGROUND OF THE INVENTION

In the modern economy, individual consumers and other entities are presented with bills for goods and services purchased from multiple vendors, service providers and others. Payment for many such goods and services are made on a periodic basis, often monthly. Others are one-time transactions. Consumers and other entities may wish to pay periodic and other bills using credit accounts. This may be desirable, for example, where liquid FUNDS are not available to make payment, where the consumer or other entity seeks to take advantage of reward or other incentive programs for making payment with credit, or for other reasons.

In recent years, enabled by the pervasiveness of the Internet, some Web-based services have been developed to enable consumers to view and pay bills online. Such services, however, facilitate payment only from the consumer's checking account, or at times from brokerage or other accounts with check-writing privileges. Such systems therefore may not function for credit accounts, and may not be optimized for the consumer who wishes to pay with credit instead of cash or cash equivalent, on a recurring basis, at certain times of the month, or with other parameters taken into account.

These and other drawbacks exist.

SUMMARY OF THE INVENTION

The invention overcoming these and other problems in the art relates to a system and method for receiving, viewing, and paying bills online with an option to make payment from one or more credit accounts. One embodiment of the system relies on Internet architectures and Web-based components to arrange selective bill paying using credit facilities and other payment modes. One embodiment of the method includes receiving bills, selecting a bill for payment, selecting a time for payment, selecting a credit account for payment, automatically receiving authorization for payment, and automated settlement of the credit account transaction. Another embodiment allows a consumer to also send payments to persons where a bill has not been received (i.e. a "pay anyone" model).

An object of the invention in one regard is to facilitate the receipt of bills that a consumer wishes to pay with credit. Another object of the invention is to enable on-time payment of bills with credit, providing a benefit to both the payor and the payee. Another object of the invention is to provide for an automated backup or rollover mechanism for payment where a credit account has reached its credit limit, when a payee does not accept payment by credit, or for other reasons.

BRIEF DESCRIPTION OF THE DRAWINGS

The invention will be described with reference to the accompanying drawings, in which like elements are referenced with like numbers.

DETAILED DESCRIPTION OF PREFERRED EMBODIMENTS

Figure 1:
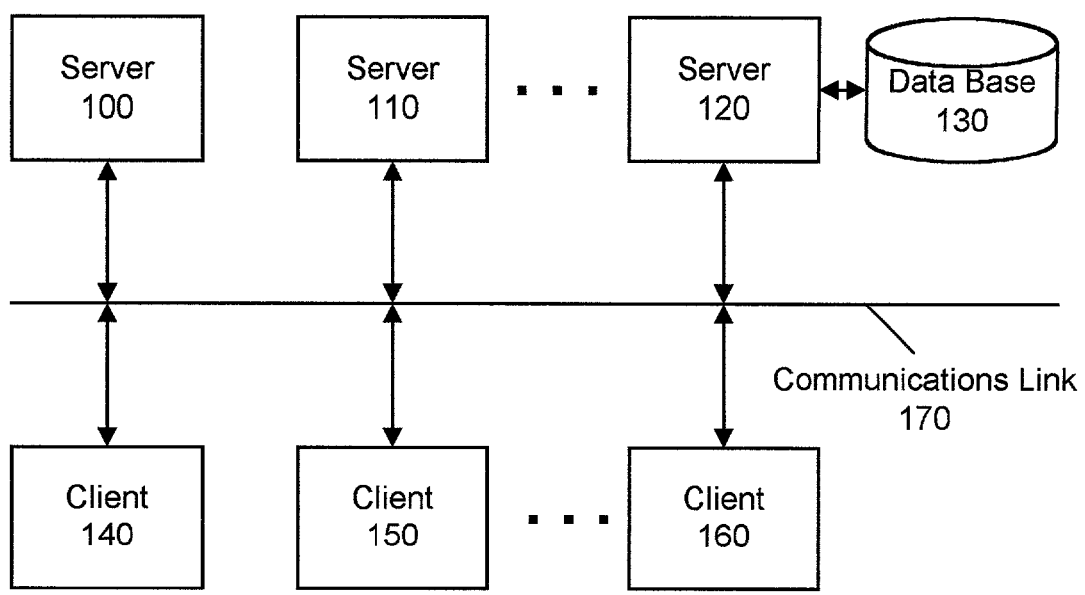
FIG. 1 is a system architecture diagram, according to one embodiment of the invention.

FIG. 1 illustrates a network architecture in which the invention may be practiced, wherein Servers 100, 110, and 120 may be linked to clients 140, 150, and 160 via communications link 170.

Servers 100, 110, and 120 may host applications facilitating transactions for banks, merchants, or other financial institutions. Servers 100, 110, and 120 may be or include, for instance, a workstation running the Microsoft Windows™ NT™, Windows™2000, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

Servers 100, 110 and 120 may interface to one or more databases. As an illustration, FIG. 1 depicts database 130, which is interfaced to server 120. Database 130 may be, include or interface to, for example, the Oracle™ relational database sold commercially by Oracle Corp. Other databases, such as Informix™, DB2 (Database 2), Sybase or other data storage or query formats, platforms or resources such as OLAP (On Line Analytical Processing), SQL (Standard Query Language), a storage area network (SAN), Microsoft Access™ or others may also be used, incorporated or accessed in the invention.

Figure 4:
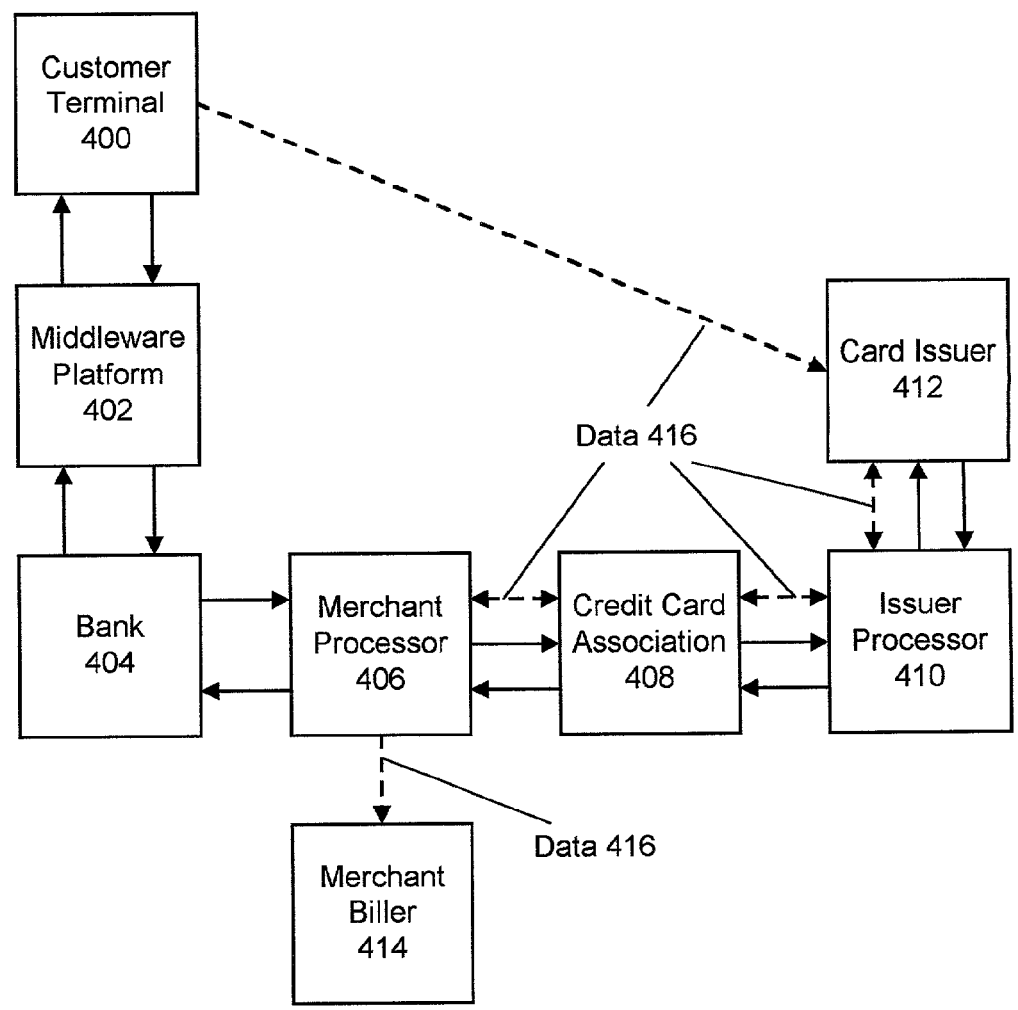
FIG. 4 is a functional architecture to implement the process flows of FIGS. 2 and 3, according to one embodiment of the invention.

Clients 140, 150, and 160 may be customer terminals such as customer terminal 400 depicted in FIG. 4, or they may be, for example, terminals used by banks, merchants or other financial institutions for system administration or for other reasons. Clients 140, 150, and 160 may be or include, for instance, a personal computer running the Microsoft Windows™ 95, 98, Millenium™, NT™, or 2000, Windows™CE™, PalmOS™, Unix, Linux, Solaris™, OS/2™, BeOS™, MacOS™ or other operating system or platform. Clients 140, 150, and 160 may include a microprocessor such as an Intel x86-based device, a Motorola 68K or PowerPC™ device, a MIPS, Hewlett-Packard Precision™, or Digital Equipment Corp. Alpha™ RISC processor, a microcontroller or other general or special purpose device operating under programmed control. Clients 140, 150, and 160 may furthermore include electronic memory such as RAM (random access memory) or EPROM (electronically programmable read only memory), storage such as a hard drive, CDROM or rewritable CDROM or other magnetic, optical or other media, and other associated components connected over an electronic bus, as will be appreciated by persons skilled in the art. Clients 140, 150, and 160 may also be or include a network-enabled appliance such as a WebTV™ unit, radio-enabled Palm™ Pilot or similar unit, a set-top box, a networkable game-playing console such as Sony Playstation™ or Sega Dreamcast™, a browser-equipped cellular telephone, or other TCP/IP client or other device.

Servers 100, 110, and 120 may be connected to each other or to clients 140, 150, or 160 via communications link 170. Communications link 170 may be, include or interface to any one or more of, for instance, the Internet, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Communications link 170 may furthermore be, include or interface to any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth, BlueTeeth or WhiteTooth radio link, or an IEEE 802.11-based radio frequency link. Communications link 170 may yet further be, include or interface to any one or more of an RS-232 serial connection, an IEEE-1394 (Firewire) connection, a Fibre Channel connection, an IrDA (infrared) port, a SCSI (Small Computer Systems Interface) connection, a USB (Universal Serial Bus) connection or other wired or wireless, digital or analog interface or connection Servers 100, 110, and 120, and clients 140, 150, and 160 may utilize network enabled code in order to facilitate functionality in a network-based environment. Network enabled code may be, include or interface to, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™, Common Gateway Interface (CGI) or other compilers, assemblers, interpreters or other computer languages or platforms.

Figure 2:
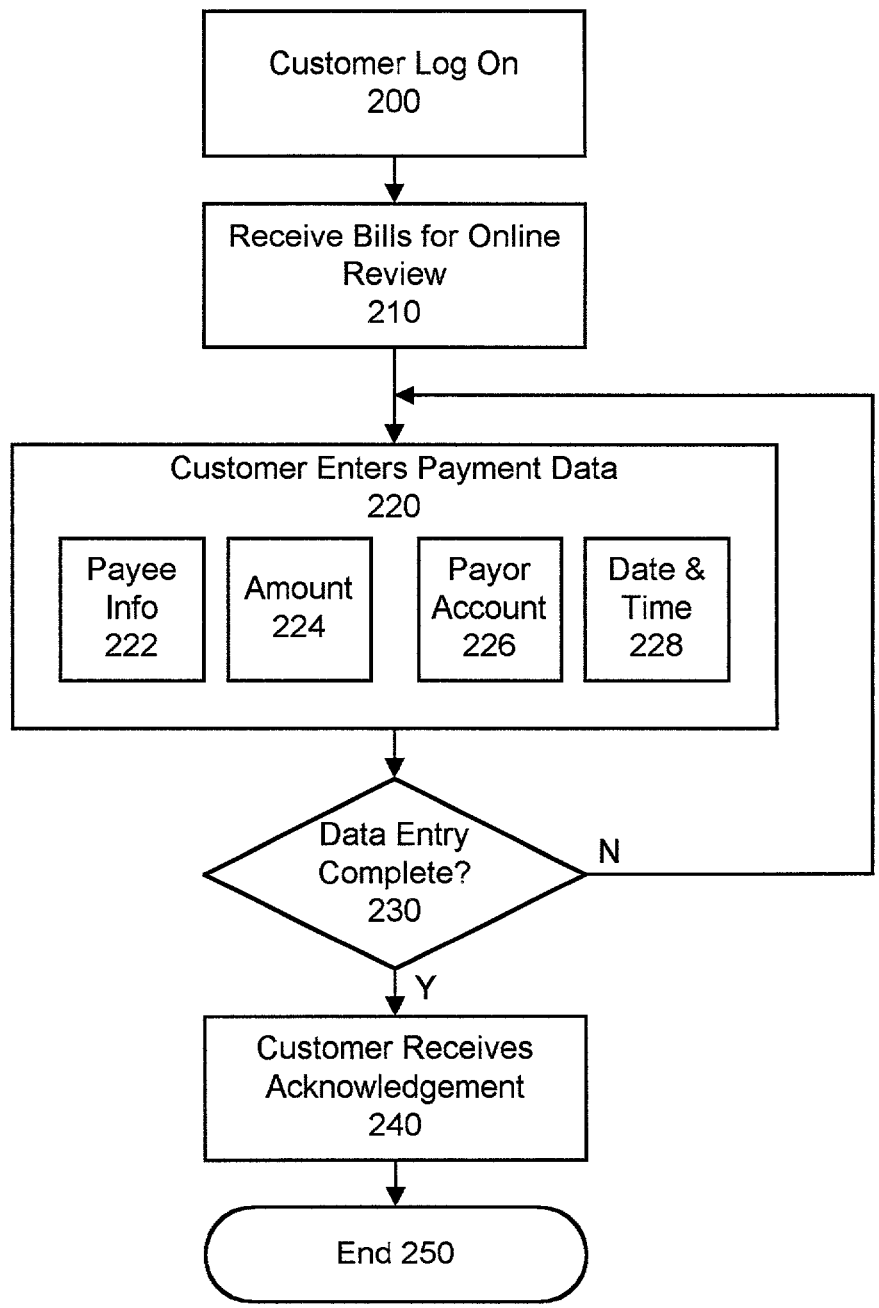
FIG. 2 is a process flow diagram from the perspective of a customer, according to one embodiment of the invention.

FIG. 2 is a process flow diagram from the perspective of a customer payor, according to one embodiment of the invention. The process may start in step 200, where, for example, the customer may utilize a client 140, 150 or 160 to log onto a payment system. Log on step 200 may require the customer to enter a username and password, and may entail additional security measures familiar to those skilled in the development of financial systems.

In step 210, the customer may receive and review bills online. An online bill may indicate, for example, the name of the payee, a description of the goods or services provided in exchange for payment, the amount owed, and the date payment is due. In one embodiment, the electronic bill may be posted to the system directly by the merchant. In another embodiment, a service provider may receive a hard copy of the bill, and post the information to the bill payment system so that the customer can receive and review the information online. In another embodiment, step 210 may not apply, for example in the case where a customer has received only a hard copy of a bill, or in the case where the customer seeks to make payment for goods or services, or to make a gift payment, in the absence of a bill or other invoice.

In step 220, the customer payor may enter payment data in preparation for an online payment transaction. In the case where a bill has not been received online, a customer payor may enter payee information 222 such as name, account number, and a description of the goods or services for which payment is to be made; in this instance, it is also necessary to specify the amount of payment 224. The customer may also specify one or more payor accounts 226 from which to make payment. Payor account 226 may be, for example, a checking, brokerage, or money market account, and may be a Direct Deposit Account (DDA). A DDA may be, for instance, a checking or savings account which a bank customer has authorized for direct deposit of wages from an employer.

Payor account 226 may also be a credit card account, a revolving credit account, or other credit account. In one embodiment of the invention, the customer payor may enter a primary account and one or more secondary accounts. A secondary account may be used for payment if, for instance, sufficient funds or credit are not available from the primary account. It also may be the case that certain payees will not accept payment from a credit account. In one embodiment of step 220, a customer may enter the date and time 228 that payment is to be made from the payor to the payee. It may be advantageous, for example, to schedule payment prior to the time that payment is due, but after automatic deposit of payroll funds into the customer's account. Step 228 may also allow a customer payor to request immediate payment to the payee. As described here, an immediate transaction may be a transaction that is initiated within minutes, seconds, or less.

Data entry in step 220 may be accomplished via menu selection, for example where a customer has received more than one online bill or where the customer has already specified one or more payor account alternatives. In another embodiment, data entry step 220 may entail manual entry of alphanumeric characters into pre-defined fields. In one embodiment, a customer may specify payment data for payment transactions in step 220 that are to be executed automatically and without further customer intervention on a recurring basis.

It may be that before a payment transaction can be executed, a certain set of data is required. In step 230, then, a decision may be made by the payment system as to whether the customer payor has specified all necessary data. Where the customer has not, the system may return the customer to step 220 to enter payment data, and the system may further prompt the customer for information that is both missing and necessary. In the case where the customer payor has entered all necessary information, the payment system may initiate the payment transaction.

From the customer payor's perspective, the next step may be an acknowledgement in step 240 that payment has been successfully made to the payee. In one embodiment, step 240 may be near real-time, and while the customer is still logged onto the system. In this instance, a customer payor may receive a system-generated message that is displayed within seconds or minutes from an immediate request for payment. In another embodiment of acknowledgment step 240, the system may send an email or other acknowledgment to the customer payor. In the case where a customer payor has specified a primary and at least one secondary account, the acknowledgement in step 240 may indicate which account or accounts from which payment has been drawn. In this instance, the system may also provide a reason in step 240 explaining why payment was not made from the customer's primary account. Once step 240 concludes, the payment transaction terminates in step 250.

Figure 3:
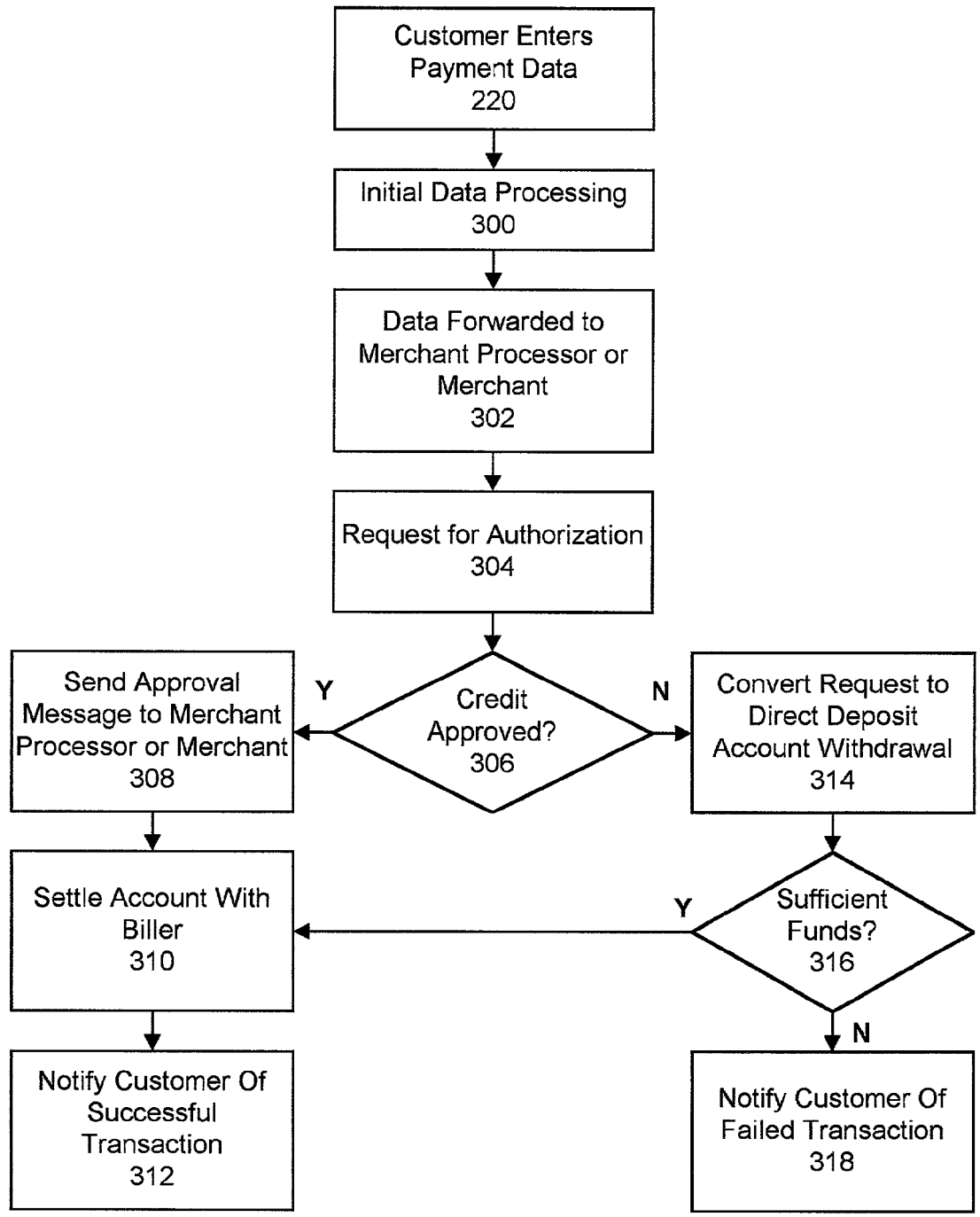
FIG. 3 is a process flow diagram from the perspective of a provider of online payment services, according to one embodiment of the invention.

FIG. 3 is a process flow diagram from the perspective of a provider of online payment services, according to one embodiment of the invention where payment is being made from a credit card, revolving credit account, or other credit account. The process may be initiated by entry of customer data as indicated by Step 220 in FIG. 3, and as described above.

In step 300, data related to payee information 222, amount 224, payor account 226, date and time 228, or other information, may be subjected to initial data processing in step 300. Step 300 processing may check for the availability of all necessary information, such as the decision described in step 230. Step 300 may also validate one or more pieces of data, for example to ensure that a valid date has been entered in step 220, or that the credit card account supplied by the customer payee in step 220 contains the correct number of numeric digits. Other validations may also be performed in step 300. Step 300 processing may additionally entail formatting data into a particular string format or other format required by downstream processes.

In step 302, formatted transaction data may be forwarded to a merchant processor, merchant, or other entity as a request for authorization. In the instance of a payment from a credit card or other credit account, credit approval step 306 will be required. The authorization performed in step 306 may involve several different entities, for example a merchant processor 406, a credit card association 408, an issuer processor 410, and a card issuer 412 as will be later described. The underlying inquiries in step 306 may be whether the credit card or other credit account is a valid account, whether the payee is an authorized user of the account, whether sufficient credit exists for the amount of payment requested, and other inquiries.

If credit is approved, a response code or other indication of approval may be sent to the merchant processor or merchant in step 308, the account may be settled with the merchant biller in step 310 (i.e., the merchant's bank account is credited for the amount of the payment), and the customer may be notified of a successful transaction in step 312.

If, on the other hand, the payor's credit is not approved in step 306, then the system may convert the payment request to a Direct Deposit Account (DDA) withdrawal in step 314, instead of a payment with credit. This may be the case, for instance, where the customer payor has specified a DDA as a secondary source for payment in step 220. In step 316, the system may verify that the DDA has sufficient funds for the requested payment transaction. If it does, then funds may be transferred from the payor's DDA to the merchant's account to settle with the merchant biller in step 310. Where the payment is made from the secondary DDA, step 312 notification may indicate that payment was made from the secondary account and not, for example, the primary credit card account that the customer payor previously selected. Of course, where it is determined in step 316 that the DDA also has insufficient funds, then the customer may be notified of a failed transaction in step 318.

In other embodiments, the secondary source for payment may be another credit account, a checking account, a brokerage account, or other account types that are not Direct Deposit Accounts.

FIG. 4 is a functional architecture to implement the process flows of FIGS. 2 and 3, according to one embodiment of the invention. Customer terminal 400 may be a client 140, 150, or 160, and may be used to perform log on step 200, review step 210, data entry step 220, receipt of acknowledgement step 240, and for other process steps.

Middleware platform 402, bank 404, Merchant processor 406, credit card association 408, issuer processor 410, and card issuer 412 may each be a server 100, 110, or 120 as illustrated in FIG. 1 and described above.

Middleware platform 402 may contain network enabled code to collect information entered in step 220, and may also perform step 300 initial data processing. In the event that credit is not approved in step 306, middleware platform 402 may execute conversion step 314. Additionally, middleware platform 402 may provide notification to customer terminal 402 as defined in notification steps 312 and 318, and as appropriate for the circumstances. The commercial Corillian™ or other service may supply the middleware platform or associated middleware services of functional element 402.

The functions of Bank 404 may include step 302 forwarding data to the merchant processor 406 and other process steps. Bank 404 may also perform step 316, determining the sufficiency of funds in a direct deposit account. In an alternative embodiment, the functional node of Bank 404 may be eliminated, in which case middleware platform 402 may communicate directly with merchant processor 406. It may be advantageous for developers of a system embodying the invention to retain Bank 404 as a component of the functional architecture as depicted in FIG. 4. Such may be the case, for instance, where interfaces already exist between bank 404 and middleware platform 402, or where interfaces already exist between bank 404 and merchant processor 406, or for other reasons.

Merchant processor 404 may initiate the request for authorization step 304. This request may be forwarded to credit card association 408, issuer processor 410, and card issuer 412 as shown in FIG. 4. Card issuer 412 may perform step 306, either approving or rejecting the credit transaction.

Credit card association 408 may be, for example, the VISA/MasterCard™, American Express™, or other payment network or interchange. Issuer processor 410 may be or include services, application software, or processors provided by, for example, First Data Corporation, Inc. (FDR), Total Systems Services, Inc. (Total), Electronic Data Systems, Inc. (EDS), or other providers. Card issuer 412 may be First USA, Citibank, or another financial institution that issued a credit card, opened a revolving credit account, or otherwise extended credit to the customer payor.

If the transaction is approved, card issuer 412 may initiate the step 308 approval message, which may be forwarded through the issuer processor 410 and credit card association 408 on its way to merchant processor 406. The actual settlement in step 310 may follow a path identical to that of request for authorization step 304 and approval step 306, except that settlement step 310 may also require that data be passed from merchant processor 406 to merchant biller 414. The execution of settlement step 310 just described is illustrated in FIG. 4 by data path 416.

The foregoing description of the invention is illustrative, and variations in configuration and implementation will occur to persons skilled in the art. The scope of the invention is accordingly intended to be limited only by the following claims.

The invention claimed is:

1. A method for a payor to make one or more online payments to one or more payees using a payment system which enables a payor to make bill payments using a credit card account to payees who do not accept credit cards, the method comprising:

provide the payor with access to an online payment system operated by a payment administrator, the online payment system operative to receive and process online payment instructions for both bills received online and bills received off-line, and further operative to process payment instructions for a payee regardless of whether the payee has agreed to use said online payment system, wherein the online payment system is operative to pay a payee without an electronic interface to the payee;

displaying to the payor, by way of a user terminal, an online bill owed to a payee, providing to the payor, for a payee who will not accept a credit card account for bill payment, a first payment mode of operation for payment of bills owed to payees, the first payment mode enabling a payor to make a bill payment using the payor's credit card account to a payee who does not accept credit cards, the first payment mode of operation comprising:

receiving a first bill payment instruction from the terminal, the first bill payment instruction comprising information to identify a credit card account of the payor, charging the credit card account of the payor an amount corresponding to the online bill owed to the payee, causing a first payment to be made from the payment administrator to the first payee by a payment mechanism not using the credit card account of the payor;

thereby allowing a payor to pay a bill to a payee who does not accept credit card payments where the payee receives a non-credit card payment for the bill while the payor is charged against the payor's credit card account;

receiving offline bill data from the terminal, the offline bill data comprising information to identify a bill received offline;

receiving a second bill payment instruction from the terminal, the second payment instruction comprising information to identify a financial account of said payor; and causing a second payment by the payment administrator for the at least one offline bill to be made from the financial account of the payor to an offline payee of the offline bill regardless of whether the offline payee has agreed to use said online payment system.

2. The method of claim 1, wherein causing the first payment to be made comprises at least one of: electronic funds transfer into an account of the payee; and printing a paper check and causing the paper check to be delivered to an address of the payee by the online payment system.

3. The method of claim 1, wherein receiving the first bill payment instruction comprises receiving identification of at least one secondary account to be used in the event that a payment transaction cannot be completed from the credit card account.

4. The method of claim 1, wherein incentives are credited based on the use of the credit card account in connection with the first payment.

5. A method for a payor to make one or more online payments using a payment system which enables a payor to make bill payments using a credit card account to payees who accept credit cards as well as to payees who do not accept credit cards the method comprising:

providing the payor with access to an online payment system operated by a payment administrator, the online payment system operative to receive and process online payment instructions for both bills received online and bills received off-line, and further operative to process payment instructions for a payee regardless of whether the payee has agreed to receive payment directly or indirectly through said online payment system, wherein the online payment system is operative to pay a payee without an electronic interface to the payee;

presenting to the payor a payment mode of operation for payment of bills owed payees that do not accept payment by credit card, the payment mode comprising:

identifying a bill due to a payee, the payee being one that does not accept payment from credit card accounts, the billing being identified by at least one of:

(a) presenting to the payor, by way of a user terminal, the bill owed to the payee, and (b) receiving from the payor, by way of the user terminal, information to identify the bill owed to the payee, the bill not being presented to the payor by way of the user terminal, receiving a bill payment instruction from the terminal, the bill payment instruction comprising information to identify a credit card account of the payor, wherein the payment administrator that operates the online payment system comprises the financial institution that issued the credit card account, the credit card account being associated with a credit card branded by a credit card association that is distinct from the payment administrator that operates the online payment system, causing a payment to be made from the payment administrator to the payee by a payment mechanism not using the credit card account, wherein the payment administrator is operative to pay online payees and offline payees regardless of whether the payee has agreed to receive payment directly or indirectly through said online payment system; and charging the credit card account of the payor for the payment.

6. The method of claim 5, wherein receiving the bill payment instruction comprises receiving identification of at least one secondary account to be used in the event that a payment transaction cannot be completed from the credit card account.

7. The method of claim 6, wherein the at least one secondary account comprises a non-credit account.

8. The method of claim 5, wherein incentives are credited based on use of the credit card account in connection with the payment.

9. The method of claim 5 wherein the payment mechanism comprises electronically transferring funds into a payee account owned by the payee.

10. The method of claim 5 wherein the payment mechanism comprises printing a paper check and causing the paper check to be delivered to an address of the payee.

11. The method of claim 1 wherein the payment administrator comprises the financial institution that issued the credit card account.

12. The method of claim 1 wherein the payment mechanism comprises electronically transferring funds into a payee account owned by the payee.

13. The method of claim 1 wherein the payment mechanism comprises printing a paper check and causing the paper check to be delivered to an address of the payee.

14. A system having a computer memory and a processor for a payor to make one or more online payments to one or more payees using a payment system which enables a payor to make bill payments using a credit card account to payees who accept credit cards as well as to payees who do not accept credit cards, the system comprising:

a processor performing instructions for providing the payor with access to an online payment system operated by a payment administrator, the online payment system operative to receive and process online payment instructions for both bills received online and bills received off-line, and further operative to process payment instructions for a payee regardless of whether the payee has agreed to receive payment directly or indirectly through said online payment system, wherein the online payment system is operative to pay a payee without an electronic interface to the payee;

computer memory for storing instructions;

a processor performing instructions for presenting to the payor a first payment mode of operation for payment of online bills for a payee that will accept a credit card account for bill payment, the first payment mode comprising:
    presenting to the payor, by way of a user terminal, an online bill owed to a first payee,
    receiving a first bill payment data set from the user terminal, the first bill payment data set comprising information to identify a first credit card account of the payor,
    requesting authorization for a first credit card transaction on said first credit card account,
    causing a first payment to be made from a payment administrator to the first payee from the first credit card account of the payor;

a processor performing instructions for presenting to the payor a second payment mode of operation for payment of bills owed to payees that do not accept payment by credit card, the second payment mode comprising:
    identifying a second bill due to a second payee that does not accept payment from credit accounts,
    receiving a second bill payment data set from the user terminal, the second bill payment data set comprising information to identify a second credit card account of the payor,
    causing a second payment to be made from the payment administrator to the second payee by a payment mechanism not using the second credit card account of the payor regardless of whether the payee has agreed to receive payment directly or indirectly through said online payment system; and a processor performing instructions for charging the second credit card account in an amount corresponding to the second payment;

receiving offline bill data from the user terminal, the offline bill data comprising information inputted by the payor to identify a bill received offline;

receiving a third bill payment data set from the user terminal identifying at least one financial account for paying the offline bill; and causing payment of the at least one offline bill to be made from the at least one account of the payor to an offline payee for the offline bill.

15. The system of claim 14 wherein the second credit card account used for the second payment is the same as the first credit card account used for the first payment.

16. The system of claim 14, wherein incentives are credited based on use of the second credit card account in connection with the second payment.

17. The system of claim 14 wherein the payment administrator comprises the financial institution that issued the second credit card account.

18. The system of claim 14 wherein the payment mechanism comprises electronically transferring funds into a payee account owned by the second payee.

19. The system of claim 14 wherein the payment mechanism comprises printing a paper check and causing the paper check to be delivered to an address of the second payee.

20. A method for a payor to make one or more payments to one or more payees using an online payment system, the method comprising:
    providing the payor with access to an online payment system operated by a payment administrator, the online payment system operative to receive and process online payment instructions for bills received online, bills input by a payor, and where a bill has not been received by the payor, and further operative to process payment instructions for a payee regardless of whether the payee has agreed to receive payment directly or indirectly through the online payment system and operative to process payment instructions for online payees and offline payees, wherein the online payment system is operative to pay a payee without an electronic interface to the payee;
    displaying to the payor, by way of a user terminal, a bill owed to a payee;
    receiving a bill payment instruction from the terminal, the bill payment instruction comprising information to identify a credit card account of the payor as a first payment mechanism; and
    requesting authorization for a credit transaction on the credit card account in an amount corresponding to the bill owed to the payee,
        the method performing processing such that in the event the transaction is authorized, causing a payment to be made to the payee from the credit account of the payor regardless of whether the payee has agreed to receive payment directly or indirectly through said online payment system; and
        the method performing processing such that in the event the transaction is not authorized, causing a payment to be made from the payment administrator to the payee utilizing a second payment mechanism.

21. The method of claim 20, wherein the transaction is not authorized because a payee does not accept credit cards.

22. The method of claim 21, wherein the payment administrator charges the credit card account of the payor for the transaction regardless of whether a payee accepts credit cards and the payee receives payment from a secondary account in the event the payee does not accept credit cards.

23. The method of claim 1, further comprising:
    providing to the payor, for a payee who will accept a credit card account for bill payment, a second payment mode of operation for payment of online bills, the second payment mode enabling a payor to make a bill payment using the payor's credit card account to a payee who accepts credit cards comprising:
        receiving a third bill payment instruction from the terminal, the third bill payment instruction comprising information to identify a credit card account of the payor,
        requesting authorization for a credit transaction on said credit card account in an amount corresponding to the online bill owed to the payee, and
        causing a first payment to be made to the payee from said credit account of the payor.

24. The method of claim 1, wherein the second payment comprises a payment scheduled by the payor for a future date.

25. The method of claim 1, wherein the second bill payment instruction comprises an instruction for a recurring payment.

26. A method for a payor to make one or more online payments to one or more payees using a payment system which enables a payor to make bill payments using a credit card account to payees who do not accept credit cards, the method comprising:

provng the payor with access to an online payment system operated by a payment administrator, the online payment system operative to receive and process online payment instructions for both bills received online and bills received off-line, and further operative to process payment instructions for a payee regardless of whether the payee has agreed to receive payment directly or indirectly through said online payment system, wherein the online payment system is operative to pay a payee without a direct electronic communication to the payee;

displaying to the payor, by way of a user terminal, an online bill owed to a payee, providing to the payor, for a payee who will not accept a credit card account for bill payment, a first payment mode of operation for payment of bills owed to payees, the first payment mode enabling a payor to make a bill payment using the payor's credit card account to a payee who does not accept credit cards, the first payment mode of operation comprising:

receiving a first bill payment instruction from the terminal, the first bill payment instruction comprising information to identify a credit card account of the payor, wherein receiving the first bill payment instruction comprises receiving identification of at least one secondary account to be used in the event that credit is not approved for the first bill payment;

charging the credit card account of the payor an amount corresponding to the online bill owed to the payee, causing a first payment to be made from the payment administrator to the first payee by a payment mechanism not using the credit card account of the payor;

thereby allowing a payor to pay a bill to a payee who does not accept credit card payments where the payee receives a non-credit card payment for the bill while the payor is charged against the payor's credit card account;

receiving offline bill data from the terminal, the offline bill data comprising information to identify a bill received offline;

receiving a second bill payment instruction from the terminal, the second payment instruction comprising information to identify a financial account of said payor; and causing a second payment by the payment administrator for the at least one offline bill to be made from the financial account of the payor to an offline payee of the offline bill regardless of whether the offline payee has agreed to receive payment directly or indirectly through said online payment system.

27. A method for a payor to make one or more online payments to one or more payees using a payment system which enables a payor to make bill payments using a credit card account to payees who do not accept credit cards, the method comprising:

providing the payor with access to an online payment system operated by a payment administrator, the online payment system operative to receive and process online payment instructions for both bills received online and bills received off-line, and further operative to process payment instructions for a payee regardless of whether the payee has agreed to receive payment directly or indirectly through said online payment system, wherein the online payment system is operative to pay a payee without an electronic interface to the payee;

displaying to the payor, by way of a user terminal, an online bill owed to a payee, providing to the payor, for a payee who will not accept a credit card account for bill payment, a first payment mode of operation for payment of bills owed to payees, the first payment mode enabling a payor to make a bill payment using the payor's credit card account to a payee who does not accept credit cards, the first payment mode of operation comprising:

receiving a first bill payment instruction from the terminal, the first bill payment instruction comprising information to identify a credit card account of the payor, charging the credit card account of the payor an amount corresponding to the online bill owed to the payee, causing a first payment to be made from the payment administrator to the first payee by a payment mechanism not using the credit card account of the payor;

thereby allowing a payor to pay a bill to a payee who does not accept credit card payments where the payee receives a non-credit card payment for the bill while the payor is charged against the payor's credit card account.

28. A method for a payor to make one or more online payments to one or more payees using a payment system which enables a payor to make bill payments using a credit card account to payees who do not accept credit cards, the method comprising:

providing the payor with access to an online payment system operated by a payment administrator, the online payment system operative to receive and process online payment instructions for both bills received online and bills received off-line, and further operative to process payment instructions for a payee regardless of whether the payee has agreed to receive payment directly or indirectly through said online payment system, wherein the online payment system is operative to pay a payee without a direct electronic communication to the payee;

displaying to the payor, by way of a user terminal, an online bill owed to a payee, providing to the payor, for a payee who will not accept a credit card account for bill payment, a first payment mode of operation for payment of bills owed to payees, the first payment mode enabling a payor to make a bill payment using the payor's credit card account to a payee who does not accept credit cards, the first payment mode of operation comprising:

receiving a first bill payment instruction from the terminal, the first bill payment instruction comprising information to identify a credit card account of the payor, wherein receiving the first bill payment instruction comprises receiving identification of a secondary account to be used in the event that credit is not approved for the first bill payment, and in the event that credit is not approved for the first bill payment, the online payment system adapted to convert the first bill payment instruction to a Direct Deposit Account (DDA) withdrawal instead of a payment with credit, the DDA constituting the secondary account;

charging the credit card account of the payor an amount corresponding to the online bill owed to the payee, causing a first payment to be made from the payment administrator to the first payee by a payment mechanism not using the credit card account of the payor;
   thereby allowing a payor to pay a bill to a payee who does not accept credit card payments where the payee receives a non-credit card payment for the bill while the payor is charged against the payor's credit card account;
receiving offline bill data from the terminal, the offline bill data comprising information to identify a bill received offline;
receiving a second bill payment instruction from the terminal, the second payment instruction comprising information to identify a financial account of said payor; and
causing a second payment by the payment administrator for the at least one offline bill to be made from the financial account of the payor to an offline payee of the offline bill regardless of whether the offline payee has agreed to receive payment directly or indirectly through said online payment system; and
the payment administrator being the issuer of the credit card account.

29. The method of claim 1, wherein the payor is provided with access to an online payment system via a browser equipped cellular telephone.

\* \* \* \* \*